(12) United States Patent
Okumura et al.

(10) Patent No.: US 7,194,674 B2
(45) Date of Patent: Mar. 20, 2007

(54) ADAPTIVE WAVEFORM EQUALIZATION FOR VITERBI-DECODABLE SIGNAL AND SIGNAL QUALITY EVALUATION OF VITERBI-DECODABLE SIGNAL

(75) Inventors: Tetsuya Okumura, Nara (JP); Shigemi Maeda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 472 days.

(21) Appl. No.: 10/625,853

(22) Filed: Jul. 22, 2003

(65) Prior Publication Data

US 2005/0193318 A1 Sep. 1, 2005

(30) Foreign Application Priority Data

Jul. 29, 2002 (JP) ............................. 2002-220199
Jul. 31, 2002 (JP) ............................. 2002-223092

(51) Int. Cl.
*H03K 5/125* (2006.01)

(52) U.S. Cl. ....................... 714/795; 375/232; 708/323
(58) Field of Classification Search ......... H03K 5/125
See application file for complete search history.

(56) References Cited

U.S. PATENT DOCUMENTS

| | | | | |
|---|---|---|---|---|
| 5,479,419 A | * | 12/1995 | Naoi et al. | 714/794 |
| 5,692,011 A | * | 11/1997 | Nobakht et al. | 375/233 |
| 5,796,693 A | | 8/1998 | Taguchi et al. | |
| 5,938,791 A | | 8/1999 | Narahara | |
| 6,148,043 A | | 11/2000 | Fujimoto | |
| 6,175,588 B1 | * | 1/2001 | Visotsky et al. | 375/232 |
| 6,735,724 B1 | * | 5/2004 | McClellan | 714/794 |

(Continued)

FOREIGN PATENT DOCUMENTS

EP        1006527 A1 *  6/2000

(Continued)

OTHER PUBLICATIONS

Ishibashi, Y. et al.; Performance Evaluation of Adaptive ARQ Schemes over Half Duplex Transmissiion Line; Proceedings of the Eighth Annual Joint Conference of the IEEE Computer and Communications Societies. Technology: Emerging or Converging: Apr. 1989.*

(Continued)

*Primary Examiner*—R. Stephen Dildine
(74) *Attorney, Agent, or Firm*—David G. Conlin; William J. Daley, Jr.; Edwards Angell Palmer & Dodge LLP

(57) ABSTRACT

The waveform equalizing device includes: an FIR filter for generating an equalized signal pattern y(i, n) on the basis of equalization of a waveform of the reproduced signal pattern u(i, n); a Viterbi decoding circuit for detecting a path metric difference s(n) between a correct path determined as a survivor path and an error path which fails to survive the correct path in Viterbi decoding based on the equalized signal pattern y(i, n); a target register for setting a target value ds for the path metric difference s(n); and a tap coefficients update circuit for adapting the equalization according to an error of the detected path metric difference from the target value. The tap coefficients update circuit adapts equalization properties so that the mean square error is minimized, thereby achieving a satisfactory result in lowering the error rate.

40 Claims, 16 Drawing Sheets

U.S. PATENT DOCUMENTS

| | | | |
|---|---|---|---|
| 6,836,511 B1 * | 12/2004 | Marukawa | 375/232 |
| 2002/0129318 A1 * | 9/2002 | Campello De Souza et al. | 714/795 |
| 2002/0181574 A1 * | 12/2002 | Aizawa et al. | 375/232 |
| 2002/0186762 A1 * | 12/2002 | Xia et al. | 375/232 |
| 2002/0196844 A1 * | 12/2002 | Rafie et al. | 375/232 |
| 2003/0043939 A1 * | 3/2003 | Okumura et al. | 714/795 |
| 2003/0067998 A1 | 4/2003 | Nakajima et al. | |

FOREIGN PATENT DOCUMENTS

| | | | |
|---|---|---|---|
| JP | 06303099 A | * | 10/1994 |
| JP | 08-046525 | | 2/1996 |
| JP | 2000-156041 | | 6/2000 |
| JP | 2000-268502 | | 9/2000 |
| JP | 2003123402 A | * | 4/2003 |

OTHER PUBLICATIONS

Lin, M. et al.; an Adaptive Scheme Using Pragmatic TCM; Singapore ICCS '94. Conference Proceedings. vol. 2, Nov. 14-18, 1994 pp. 649-652.*

Lin V. S. et al.; Robust Adaptive Error Control; Wireless Communications and Networking Conference, 2000. WCNC. 2000 IEEE vol. 2, Sep. 23-28, 2000 pp. 644-648.*

Chakraborty, S.S et al.; An adaptive ARQ scheme with packet combining for time varying channels; Communications Letters, IEEE vol. 3, Issue 2, Feb. 1999 pp. 52-54.*

Minn, H et al.; On ARQ scheme with adaptive error control; Vehicular Technology, IEEE Transactions on; vol. 50, Issue 6, Nov. 2001 pp. 1426-1436.*

Sklar, Bernard; How I Learned to Love the Trellis; IEEE Signal Processing Magazine; vol. 20, Issue 3; May 2003; pp. 87-102.*

Haykin, "Adaptive Filter Theory", Gendai Kougaku-sha (Modern Engineering Inc.), $1^{st}$ Ed., Sep. 10, 1987; $4^{th}$ Ed. Jul. 1, 1999; pp. 9-11, 91-111.

Perkins, et al., "A Window-Margin-Like Procedure for Evaluating PRML Channel Performance", IEEE Transactions on Magnetics, vol. 31, No. 2, Mar. 1995; pp. 1109-1114.

Okumura, et al., "New adaptive equalization method for PRML system using sequenced amplitude margin", Optical Society of America SPIE IEEE/LEOS, May 11-14, 2003; pp. 96-98.

Okumura, et al., "A Method for Evaluating PRML System Reliability Using Sequenced Amplitude Margin", International Symposium On Optical Memory 2001, Oct. 16-19, 2001; pp. 272-273.

* cited by examiner

DATA BIT PATTERN

RECORDED MARK

REPRODUCED SIGNAL
AND SAMPLE LEVEL

HISTOGRAM OF PATH METRIC DIFFERENCE FROM IDEAL WAVEFORM

HISTOGRAM OF PATH METRIC DIFFERENCE FROM ACTUAL WAVEFORM

FIG. 6

| IDEAL PATH METRIC DIFFERENCE | BIT PATTERN |
|---|---|
| 1.5 | 0 0 1 1 1 |
| | 1 1 0 0 0 |
| | 0 0 0 1 1 |
| | 1 1 1 0 0 |
| 2.5 | 0 0 0 1 1 0 0 |
| | 1 1 1 0 0 1 1 |
| 3.5 | 0 0 0 1 1 0 0 1 1 |
| | 1 1 1 0 0 1 1 0 0 |
| 4.5 | 0 0 0 1 1 0 0 1 1 0 0 |
| | 1 1 1 0 0 1 1 0 0 1 1 |
| 5.0 | 0 0 0 0 0 0 |
| | 1 1 1 1 1 1 |
| | 0 0 1 1 1 1 |
| | 1 1 0 0 0 0 |
| | 0 0 1 1 0 0 1 1 0 0 1 1 |
| | 1 1 0 0 1 1 0 0 1 1 0 0 |
| 6.0 | 0 0 0 1 1 1 1 |
| | 1 1 1 0 0 0 0 |
| 7.0 | 0 0 0 1 1 0 0 0 0 |
| | 1 1 1 0 0 1 1 1 1 |
| 8.0 | 0 0 0 1 1 0 0 1 1 1 1 |
| | 1 1 1 0 0 1 1 0 0 0 0 |
| 9.0 | 0 0 1 1 0 0 1 1 0 0 1 1 1 1 |
| | 1 1 0 0 1 1 0 0 1 1 0 0 0 0 |
| | 0 0 0 1 1 0 0 1 1 0 0 0 0 |
| | 1 1 1 0 0 1 1 0 0 1 1 1 1 |

US 7,194,674 B2

ADAPTIVE WAVEFORM EQUALIZATION FOR VITERBI-DECODABLE SIGNAL AND SIGNAL QUALITY EVALUATION OF VITERBI-DECODABLE SIGNAL

This application claims priority under 35 U.S.C. §119 to Japanese patent application numbers JP 2002-220199 filed Jul. 29, 2002 and JP 2002-223092 filed Jul. 31, 2002, the teachings of which are incorporated herein by reference.

FIELD OF THE INVENTION

The present invention relates to a waveform equalizing device, method, and program for adaptive equalization of the waveform of a reproduced signal in a signal reproduction system; a computer-readable storage medium with the waveform equalization program stored thereon; and an information reproducing device and communications device incorporating the waveform equalizing device.

Further, the present invention relates to a PRML (Partial Response Maximum Likelihood) signal process, and more specifically to a signal quality evaluation method for evaluating quality of a Viterbi-decoded digital signal, a signal quality evaluation device and a reproduction apparatus having the same, a signal quality evaluation program and a computer-readable storage medium having the same.

BACKGROUND OF THE INVENTION

PRML (Partial Response Maximum Likelihood) has been adopted as a data detection method to provide information storage media (hereinafter, simply "storage media") with higher recording densities. In PRML, waveform equalization is necessary to produce from the storage medium a reproduced waveform having frequency characteristics similar to those ideal ones which are assumed in PR class. In addition, an adaptive equalization technique is used to adaptively update the equalization properties of waveform equalization according to property irregularities of individual storage media and reproduction properties variations caused by variations in property of a reproduction system, such as disk tilting and servo offset, which are present in the reproduction from the storage medium.

An exemplary conventional adaptive equalization technique is called LMS (Least Mean Square) scheme.

The conventional scheme technique will be described in the following with reference to FIGS. 13 and 14, taking as an example PRML data detection on the basis of PR(1,2,1) properties. FIG. 13 is a graph illustrating a relationship between a reproduced waveform and an ideal waveform assumed in accordance with PR(1,2,1) properties. In FIG. 13, u(i−2), u(i−1), u(i), . . . represent a reproduced signal pattern obtained by converting the reproduced waveform from analog to digital with a channel clock; and d(i−2), d(i−1), d(i), . . . , represent an ideal waveform signal pattern at times corresponding to u(i−2), u(i−1), u(i), . . . .

FIG. 14 is a block diagram illustrating the structure of a conventional waveform equalizing device 50. The waveform equalizing device is provided with an FIR filter (Finite impulse response filter) 52 with 3 taps (equalization coefficient or tap coefficient=c(k,i) where k=0, 1, 2), an LMS calculator circuit 53, and an ideal waveform generating circuit 54. The waveform equalizing device 50 equalize a reproduced waveform to an ideal signal waveform assumed in PR class by obtaining equalization errors from the two waveforms by LMS and adaptively varying equalization properties to reduce the equalization errors.

The waveform equalizing device 50 operates as follows: In the FIR filter 52, the reproduced signal u(i) received at a time i is delayed by delay elements having a channel time T and convolved with the tap coefficient c(k,i). The output is an equalized signal: y(i−1)=c(0,i)u(i)+c(1,i)u(i−1)+c(2,i)u(i−2). The ideal waveform generating circuit 54 generates an ideal PR(1,2,1) waveform signal d(i−1) for the reproduced signal u(i−1). The LMS calculator circuit 53 receives the ideal waveform signal d(i−1), the tap coefficient c(k,i) at the time i, the equalized signal y(i−1), and the reproduced signal pattern u(i−2), u(i−1), u(i). Upon reception of the reproduced signal u(i) at the time i, the LMS calculator circuit 53 calculates a new tap coefficient c(k,i+1) given by $$c(k,i+1)=c(k,i)-\mu\{y(i-1)-d(i-1)\}u(i-k),$$

according to which the FIR filter 52 updates the tap coefficient at a time i+1.

The above expression evaluated by the LMS calculator circuit 53 is known typically as the LMS algorithm, where $\mu$ is a constant termed a step gain. Filter theory demonstrates: if the step gain $\mu$ is set to an appropriate value, the tap coefficient c(k,i) converges to a predetermined value with recursive updates; and the mean square error $E[\{y(i)-d(i)\}^2]$ (E is an operator for an expectation) from the ideal waveform is the smallest in the equalization of the reproduced waveform based on the value to which the tap coefficient ultimately converges.

Another LMS-based technique is disclosed in Japanese Published Unexamined Patent Application 2000-156041 (Tokukai 2000-156041; published on Jun. 6, 2000). The technique performs adaptive equalization, targeting the reproduction impulse response after servo error adjustment as ideal reproduction properties.

Japanese Published Unexamined Patent Application 10-21651 (Tokukaihei 10-21651/1998, published on Jan. 23, 1998) discloses a technique based on an evaluation function which evaluates a reproduced waveform, not to perform waveform equalization, but to adjust, for example, sampling phase irregularities and track offsets in a reproducing operation. The technique obtains the standard deviation of a difference metric which is output by an optimal decoder and then chosen. The standard deviation is employed as the foregoing evaluation function. Adjustment is made so as to minimize the standard deviation.

However, waveform equalization generally enhances noise in high frequency range; therefore, if adaptive equalization based on an LMS algorithm is performed on a low-resolution reproduced signal (i.e., notable decay in high frequency components) due to high density recording, with an ideal waveform assumed in PR class as a target, as is done by the waveform equalizing device 50, high frequency components are greatly enhanced, and the S/N (Signal to Noise) ratio deteriorates. Thus, the equalization does not always provide the lowest error rate. In other words, the signal waveform equalized for the lowest error rate show decayed high frequency components in comparison to those assumed in PR class. The degree of the decay varies greatly from one reproduction system to another.

Therefore, for the lowest error rate, adaptive equalization needs to be performed to optimize equalization properties, taking the correlation between the equalization properties and the error rate into consideration.

The technique disclosed in Tokukai 2000-156041 mentioned above requires, prior to any other process, the generation of an ideal waveform through servo optimization. The start-up time is therefore long, and the start-up process is complex. Further, the technique employs the reproduced waveform as such in a servo optimized state, that is, a waveform before equalization, as the ideal waveform. Hence, the ideal waveform does not really have a low error rate. Adaptive equalization through this technique again does not always ensure equalization properties with the lowest error rate.

The technique disclosed in Tokukaihei 10-21651/1998 mentioned above goes no further than the adjustment of, for example, sampling phase irregularities and track offsets in a reproducing operation, falling short of equalizing the waveform. The adjustment is less effective and hence more difficult to achieve a satisfactory result in lowering the error rate than suitable waveform equalization.

Meanwhile, with digitalization of various kinds of information such as image information and sound information, amounts of digital information are dramatically increased. Accordingly, a storage medium suitable for higher capacity/higher density and a storage/reproducing device are being developed. An example of the storage medium, which is suitable for higher capacity/higher density and is superior in portability, is an optical disc.

The higher density of the optical disc deteriorates the quality of the reproduced signal read out from the optical disc. Thus, it is important to evaluate the reproduced signal so as to guarantee the quality of the reproduced signal. The evaluation of the reproduced signal is performed to check the quality of the optical disc before shipment for example, or to adjust parts of the optical disc so that the quality of the reproduced signal is optimized.

Conventionally, jitter has been often used as an evaluation value of the reproduced signal quality upon evaluating the optical disc. However, PRML is being adopted as a data detection method for realizing higher density storage recently. Under such condition, jitter which represents irregularities in a direction of a time base is not suitable as an evaluation value. Further, a bit error rate of a data detection result that has been obtained by PRML is used as the evaluation value, but this brings about many disadvantages as follows: a large number of sample bits are required upon measurement, and defects caused by flaws of a disk tend to influence the evaluation, and other similar disadvantages are brought about.

In such background, an evaluation method, called SAM (Sequenced Amplitude Margin), by which quality of a reproduced signal is evaluated, is proposed (T. Perkins, "A Window-Margin-Like Procedure for Evaluating PRML Channel Performance"; IEEE Transactions on Magnetics, Vol. 31, No. 2, 1995, p1109–1114).

Here, a concept of SAM is described with reference to FIGS. 21 and 22. As an example, the following describes a case where a reproduced signal of a bit pattern that has been recorded on the basis of d=1 (1, 7) RLL (Run Length Limited) Coding is decoded in PRML, in accordance with PR (1, 2, 1) properties.

As shown in FIG. 21, a reproduced waveform in accordance with PR(1,2,1) properties with an ideal 1T mark free from any distortion or noise has a 1:2:1 level ratio of samples for a channel clock. For a reproduced waveform from a 2T or more mark, the level ratio is obtainable from the superimposition of the reproduced waveform from a 1T mark. For example, the sample level ratio is 1:3:3:1 for the one with a 2T mark, 1:3:4:3:1 for the one with a 3T mark, and 1:3:4:4:3:1 for the one with a 4T mark. An ideal reproduced waveform can be assumed for any given bit pattern. There are five ideal sample levels (ideal sample levels): 0, 1, 2, 3, and 4.

As a technique for specifically realizing PRML decoding, Viterbi decoding is adopted. The Viterbi decoding is described as follows with reference to a trellis diagram shown in FIG. 22. In FIG. 22, S(00), S(01), S(10), and S(11) each represents a different state: for example, the state S(00) means a 0 previous bit and a 0 current bit. A line linking a state to the other is termed a "branch," which represents a state transition: for example, a branch of S(00)-S(01) represents a "001" bit pattern. Here, the S(01)-S(10) and S(10)-S(01) branches are missing from the diagram. This is because the 010 and 101 bit patterns cannot occur due to the d=1 (1,7) RLL.

Further, in FIG. 22, each letter of $\alpha$ to $\zeta$ is allocated to each branch as an identifier, and an ideal waveform level expected at each state transition follows the identifier. In PR (1, 2, 1), an ideal waveform level is determined by three successive bits: v0, v1, and v2, and a value of the ideal waveform level is calculated by v0+2v1+v2. For example, when a represents a "000" bit pattern, the ideal level is 0, and when $\beta$ represents a "100" bit pattern, the ideal level is 1.

In the trellis diagram, a "path" is formed by connecting continuous branches between the states. To consider all the paths generated after transiting from any one of states to another means to consider all the possible bit patterns. The most likely path, or the "correct path," can be determined by comparing the waveform actually reproduced from the optical disc with every ideal waveform derived from the paths to find the ideal waveform that is the "closest" to the reproduced waveform, that is, the one with the least Euclidean distance from the reproduced waveform.

A Viterbi decoding procedure based on a trellis diagram will be specifically described. At any given time, there are two paths merging at each of states S(00) and S(11), whereas there is a single path coming in to each of S(01) and S(10). Of the two paths merging at S(00) and S(11), retain the one with a less Euclidean distance between the ideal waveform and the reproduced waveform; this leaves four paths each terminating at a different one of the four states at any given time.

The square of the Euclidean distance between the ideal and reproduced waveforms for a path is termed the path metric. The path metric is calculated by summing up branch metrics for all branches making up the path (the branch metric is the square of the difference between the ideal sample level of the branch and the sample level of a reproduced waveform). When a sample level of the reproduced waveform at time t is X[t] (the reproduced waveform is normalized so that an amplitude is ±2 and a central level is 2 so as to correspond to the ideal waveform of PRML), branch metrics of branches $\alpha$, $\beta$, $\gamma$, $\delta$, $\epsilon$, and $\zeta$ at time t are B$\alpha$[t], B$\beta$[t], B$\gamma$[t], B$\delta$[t], B$\epsilon$[t], and B$\zeta$[t] respectively, and path metrics of survivor paths at the states S(00), S(01), S(10), and S(11) at time t are M(00)[t], M(01)[t], M(10)[t], and M(11)[t] respectively, the branch metric is calculated in accordance with the equation (31), and the path metric is calculated in accordance with the equation (32). A process of selecting a smaller path metric from M(00)[t] and M(11)[t] corresponds to determination of a survivor path.

$$B\alpha[t]=(X[t]-0)^2$$

$$B\beta[t]=B\gamma[t]=(X[t]-1)^2$$

$$B\delta[t]=(X[t]-4)^2$$

$$B\zeta[t]=(X[t]-4)^2 \tag{31}$$

$$M(00)[t]=\text{Min}\{M(00)[t-1]+B\alpha[t],M(10)[t-1]+B\beta[t]\}$$

$$M(01)[t]=M(00)[t-1]+B\gamma[t]$$

$$M(10)[t]=M(11)[t-1]+B\delta[t]$$

$$M(11)[t]=\text{Min}\{M(01)t-1+B\epsilon[t],M(11)[t-1]+B\zeta[t]\}$$

$$(\text{Min}\{m,n\}=m(\text{if } m\leq n){:}n(\text{if } m>n)) \quad (32)$$

When the procedure for determining the survivor path every time the sample values of the reproduced waveform are received, a path with a greater path metrics is eliminated, so that the number of paths are gradually narrowed into one. This one is regarded as the correct path, so that the original data bit pattern is correctly reproduced.

Here, let us now consider conditions under which Viterbi decoding is correctly done. For the correct path to be ultimately chosen, the path metric must be smaller for the correct path than for other, error path every time a survivor path is determined. This condition is expressed by the equation (33).

(when the correct bit pattern is " . . . 000")

$$\Delta M=(M(10)[t-1]+B\beta[t])-(M(00)[t-1]+B\alpha[t])>0$$

(when the correct bit pattern is " . . . 100")

$$\Delta M=(M(00)[t-1]+B\alpha[t])-(M(10)[t-1]+B\beta[t])>0$$

(when the correct bit pattern is " . . . 011")

$$\Delta M=(M(11)[t-1]+B\zeta[t])-(M(01)[t-1]+B\epsilon[t])>0$$

(when the correct bit pattern is " . . . 111")

$$\Delta M=(M(01)[t-1]+B\epsilon[t])-(M(11)[t-1]+B\zeta[t])>0 \quad (33)$$

(when the correct bit pattern is " . . . 001" or " . . . 110")

Because the survivor path is correctly determined, $\Delta M>0$ always holds.

In the equation (33), $\Delta M$ is a path metric difference between two paths one of which will be the survivor path, and the difference is termed SAM. It is necessary that SAM>0 so that any error does not occur, which shows that: the less error occurs, the larger SAM becomes.

FIG. 23 is a histogram (frequency distribution) of SAM calculated from the reproduced signal of the (1,7) RLL code pattern that has been actually stored on an optical disc. As apparent from this result, SAM histogram has two waves. This is because the bit patterns are different from each other in the Euclidean distance between the correct path and the error path in a case of calculating SAM for all the reproduced signals.

That is, as shown in FIG. 24, the SAM histogram of a totally noise-free ideal reproduced signal on the basis of the (1,7) RLL code pattern takes discrete values (ideal values) of 6, 10, 14, 18, 20, 24, 28, 32, 36, . . . . The frequencies of the ideal values vary because the number of bit patterns vary from one ideal value to another, and the bit patterns occur at different probabilities in (1,7) RLL coding. Because of the presence of various kinds of noise in the reproduced signal, there are irregularities in the ideal values. As a result, the distribution is such that a plurality of distributions are superimposed as shown in FIG. 23.

The SAM histogram has such characteristics, and shows a distribution which largely differs from a normal distribution. Thus, even if a standard deviation is simply calculated from the distribution, this has little correlativity with the bit error. In a technique recited in Japanese Published Unexamined Patent Application 10-21651 (Tokukaihei 10-21651/1998, published on Jan. 23, 1998), SAM histogram is generated by selecting only such a pattern that the noise is highly likely to cause SAM<0 and SAM ideal value=6, and a standard deviation is calculated as an index for indicating the irregularities in the pattern, so as to evaluate the quality of the reproduced signal.

However, the conventional arrangement brings about the following disadvantages: it is necessary to realize the foregoing Viterbi decoding circuit to calculate SAM, and it is necessary to make a new arrangement for determining which $\Delta M$ should be selected from the equation (33) as SAM corresponding to the correct bit pattern, so that the circuit is complicated.

Further, in case of designing a system of a reproducing device for a storage medium by using an existing signal processing LSI whose PRML function has been blackboxed, it is impossible to calculate SAM.

SUMMARY OF THE INVENTION

The present invention is conceived in view of the foregoing problems and has a first objective to realize a waveform equalizing device and method capable of lowering the decoding error rate in a more satisfactory manner than conventional techniques.

Further, the second object of the present invention is to provide a signal quality evaluation method and a signal quality evaluation device by which quality of a digital signal can be evaluated based on a path metric difference with a simple arrangement.

In order to achieve the first object, the waveform equalizing device of the present invention which adaptively equalizes a waveform of a Viterbi-decodable input signal pattern includes: an FIR filter for generating an equalized signal pattern on the basis of equalization of a waveform of the input signal pattern; a Viterbi decoding circuit for detecting a path metric difference between a correct path and an error path in Viterbi decoding based on the equalized signal pattern; a target value register for setting a target value for the path metric difference; and a tap coefficients update circuit for adapting the equalization according to an error of the detected path metric difference from the target value.

Further, in order to achieve the first object, the waveform equalization method of the present invention for cadaptively equalizing a waveform of a Viterbi-decodable input signal pattern includes the steps of: (a) generating an equalized signal pattern on the basis of equalization of a waveform of the input signal pattern; (b) detecting a path metric difference between a correct path and an error path in Viterbi decoding based on the equalized signal pattern; and (c) adapting the equalization according to an error of the detected path metric difference from a target value for the path metric difference.

According to the foregoing arrangement and method, the path metric difference is detected based on the equalized signal pattern, and equalization properties are adapted by using the path metric difference.

As described above, in the adaptable equalization based on the conventional LMS scheme, the error rate of the decoded signal is not taken into consideration, and the equalization properties are adapted in each signal on the basis of the input signal and the ideal waveform signal, so that the error rate is not necessarily lowest upon the equalization.

Meanwhile, if the equalization properties are adapted by using the path metric difference, it is possible to take into consideration the error rate upon the adaptation. This is based on the following reason. The path metric difference is an index for determining a correct path out of two paths one of which will be a survivor path in Viterbi decoding. Thus, the path metric difference indicates how likely the equalized signal pattern, on which the detection of the path metric difference is based, will cause an error path to be regarded as the survivor path upon decoding, that is, indicates how often the error will occur upon decoding. Therefore, if the equalization properties are adapted by using the path metric difference, it is possible to take into consideration the error rate upon the adaptation, so that it is possible to achieve a satisfactory result in lowering the error rate caused by decoding.

Here, in order to lower the error rate, irregularities in the path metric difference detected for a predetermined path is decreased. However, if the standard deviation of the path metric difference is calculated and the equalization properties are adapted so as to minimize the standard deviation upon decreasing the irregularities in the path metric difference, the computation is complicated. Thus, it is extremely difficult to carry out such method, and the method has not been realized.

In the present invention, considering that an ideal path metric difference is determined for a predetermined path and that an actually detected path metric difference has irregularities with respect to the ideal path metric difference, a target value of the path metric difference is first set, and the equalization properties are adapted on the basis of an error between the actually detected path metric difference and the target value that has been set as described in the foregoing arrangement and method. Thus, it is possible to perform the necessary computation much more simply than the case where the standard deviation of the path metric difference is calculated and the equalization properties are adapted so as to minimize the standard deviation as described earlier.

As a result, it is possible to realize the waveform equalizing device and the waveform equalization method which can achieve a satisfactory result in lowering the error rate caused by decoding, in accordance with the foregoing arrangement and method.

In order to achieve the second object, the signal quality evaluation device evaluates quality of a Viterbi-decodable digital signal, and includes: a specific patterns detection circuit for detecting one of specific patterns in a bit pattern corresponding to the digital signal; and a computing circuit for, when the specific patterns detection circuit detects one of the specific patterns, computing a path metric difference between a correct path dictated by the detected one of the specific patterns and an error path which fails to survive the correct path in Viterbi decoding, according to the digital signal, using equations each predetermined for a different one of the specific patterns.

Further, in order to achieve the second object, the signal quality evaluation method, whereby evaluating quality of a Viterbi-decodable digital signal, includes the steps of: (a) detecting one of specific patterns in a bit pattern corresponding to the digital signal; and (b) when step (a) detects one of the specific patterns, computing a path metric difference between a correct path dictated by the detected one of the specific patterns and an error path which fails to survive the correct path in Viterbi decoding, according to the digital signal, using equations each predetermined for a different one of the specific patterns.

According to the arrangement and the method, it is possible to compute the path metric difference between the correct path and the error path that are dictated by the specific patterns when one of the specific pattern is detected to the digital signal. Here, as the equation given to the path metric difference, at least an equation corresponding to the specific pattern is predetermined. Further, the path metric difference can be computed, for example, by multiplying a plurality of digital signal patterns corresponding to the digital signal by a coefficient and by adding the multiplied value to a constant value.

Thus, it is possible to calculate the path metric difference (SAM) between the correct path and the error path in Viterbi decoding, so that it is possible to evaluate the quality of the digital signal based on the path metric difference with a simple arrangement. Further, it is not necessary to use the Viterbi decoder upon computing the path metric difference. Therefore, it is possible to evaluate the quality of the digital signal that has not been subjected to the signal process for Viterbi decoding based on the path metric difference.

Thus, it is possible to evaluate the quality of the digital signal based on the path metric difference with high accuracy without using a complicate Viterbi decoding circuit. Therefore, even in a case of designing a system such as an optical disc reproducing device by using an existing signal processing LSI whose PRML function has been black-boxed, it is not necessary to additionally provide a Viterbi decoding circuit for evaluating the digital reproduced signal.

Note that the bit pattern corresponding to the digital signal may be generated from the target digital signal, or may be additionally obtained from a memory and the like when the bit pattern is known like a test track of an optical disc.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 6 is a table of bit patterns each of which correspond to each ideal path metric difference in a reproduction system where PR (1, 2, 1) ML is combined with (1, 7) RLL.

DESCRIPTION OF THE EMBODIMENTS

Embodiment 1

The following will describe a first embodiment of the present invention with reference to FIGS. 1 to 10.

Figure 1:
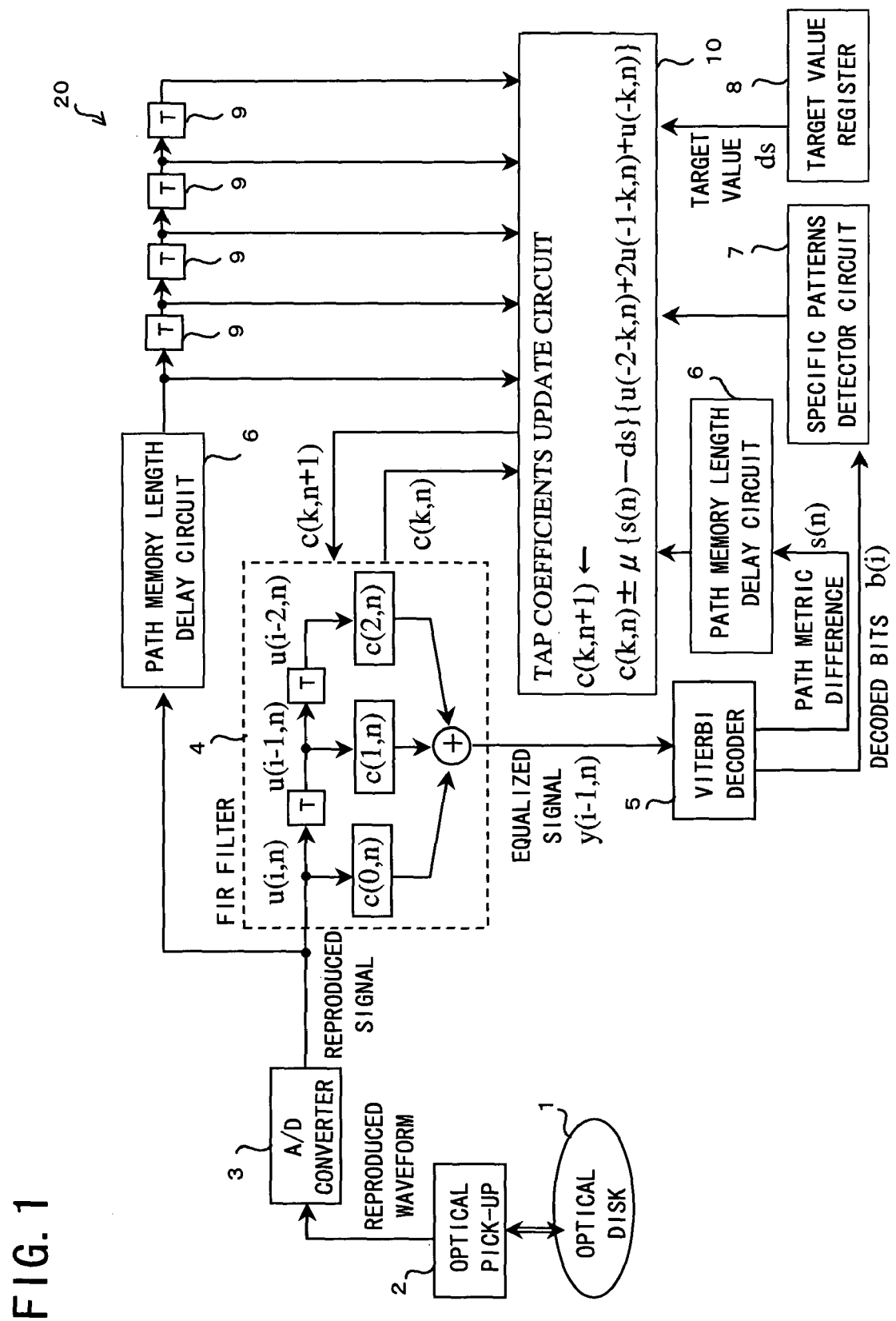
FIG. 1 is a block diagram showing an arrangement of an optical disc reproducing device according to a first embodiment of the present invention.

FIG. 1 is a block diagram showing an arrangement of an optical disc reproducing device (information reproducing device) 20 incorporating a waveform equalizing device according to the present invention. The optical disc reproducing device 20 reproduces data on an optical disc 1 and includes an optical pickup 2, A/D converter 3, FIR filter 4, Viterbi decoder 5, path memory length delay circuits 6, specific patterns detector circuit 7, target value register 8, T-delay elements 9 (T here and in the following description refers to one channel bit time of a reproduced signal), and tap coefficients update circuit 10.

The optical disc 1 has a mark pattern recorded thereon based on d=1 RLL (Run Length Limited) coding, such as S(1,7) RLL coding, that is, modulation with the shortest mark length of 2T.

The optical pickup (reproduction means) 2 reproduces an analog reproduced waveform (signal waveform) having a reproduced signal pattern (input signal pattern) from the optical disc (information storage medium) 1. The optical pickup 2 is made of a semiconductor laser, various optical components, a photo diode, and other parts (not shown). The optical pickup 2 collects a laser beam emitted from the semiconductor laser onto the optical disc 1 so that the beam reflects off recorded marks recorded on the optical disc 1. The optical pickup 2 then transduces the reflection to an electricity signal using a photo diode, to output an analog reproduced waveform (hereinafter, simply "reproduced waveform").

The A/D converter 3 converts the reproduced waveform from the optical pickup 2 from analog to digital according to a channel frequency clock. The output from the A/D converter 3 is an A/D-converted digital reproduced signal (hereinafter, simply "reproduced signal").

The FIR filter 4 (equalization means) generates an equalized signal pattern by performing waveform equalization on the basis of the reproduced signal pattern. The FIR filter 4 is a digital filter equipped with two T-delay elements, three gain variable amplifiers (gains are c(0,n), c(1,n), and c(2,n) respectively), and an adder. Here, the gains c(0,n), c(1,n), and c(2,n) are tap coefficients (equalization coefficients); changing the values of the gains causes varying equalization properties of the FIR filter 4. The FIR filter 4 equalize the reproduced waveform based on the tap coefficients to output an equalized signal y(i−1,n). The meaning of "n" will be detailed later.

The Viterbi decoder (decoding means, path metric difference detection means) 5 Viterbi decodes the equalized signal y(i−1,n) from the FIR filter 4 on the basis of the PR(1,2,1) properties (waveform interference width=3T), to output a decoded bit pattern b(i) for the recorded marks recorded on the optical disc 1. The Viterbi decoder 5 also calculates the path metric difference s(n) between the two paths which merge in Viterbi decoding for output.

The path metric difference s(n) is called SAM (Sequenced Amplitude Margin), which is well known as can be seen in "A Window-Margin-Like Procedure for Evaluating PRML Channel Performance" by T. Perkins, IEEE, Transactions on Magnetics, Vol. 31, No. 2, 1995, p1109–1114 and other publications.

The Viterbi decoder (information data decoding means) 5 also generates an information data bit pattern which will be used as information data. The information data bit pattern may be the decoded bit pattern b(i) or separately generated. The information data is data which should actually be reproduced by the optical disc reproducing device 20 and is required to be faithful reproduction of the recorded data on the optical disc 1.

The path memory length delay circuit 6 is a delay element corresponding to a path memory length (time) L of the Viterbi decoder 5.

The specific patterns detector circuit (pattern detection means) 7 determines whether the decoded bit pattern b(i−4), b(i−3), . . . , b(i) from the Viterbi decoder 5 match one of specific patterns 00111, 00011, 11000, and 11100.

The target value register (target value setting means) 8 sets a target value ds for the path metric difference s(n) and holds the target value ds.

Every time the specific patterns detector circuit 7 detects one of the specific patterns, the tap coefficients update circuit (equalization adapting means) 10 calculates a new tap coefficient c(k,n+1) given by $$c(k,n+1)=c(k,n)\pm\mu\{s(n)-ds\}\{u(-2-k,n)+2u(-1-k,n)+u(-k,n)\} \quad (1)$$

and updates the tap coefficient of the FIR filter 4. "n" is a value corresponding to the number of times a specific pattern is detected. In other words, the tap coefficient is updated every time for the n-th detected specific pattern.

Now, the decoding by the Viterbi decoder 5 will be described in more detail with reference FIGS. 2 and 3.

Figure 2:
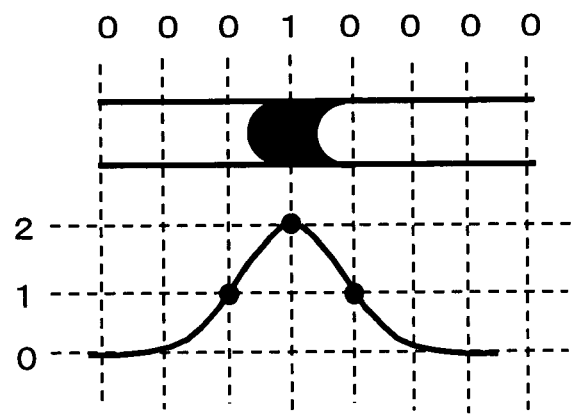
FIG. 2 is a schematic showing a relationship among a data bit pattern, a recorded mark, a reproduced waveform based on PR (1, 2, 1) properties and sample levels thereof.

Referring to FIG. 2, a reproduced waveform in accordance with PR(1,2,1) properties with an ideal 1T mark free from any distortion or noise has a 1:2:1 level ratio of samples for a channel clock. For a reproduced waveform from a 2T or more mark, the level ratio is obtainable from the superimposition of the reproduced waveform from a 1T mark. For example, the sample level ratio is 1:3:3:1 for the one with a 2T mark, 1:3:4:3:1 for the one with a 3T mark, and 1:3:4:4:3:1 for the one with a 4T mark. An ideal reproduced waveform can be assumed for any given bit pattern. There are five ideal sample levels (ideal sample levels): 0, 1, 2, 3, and 4. Here, for convenience, the sample levels are normalized so that the maximum amplitude is ±1; the resultant five ideal sample levels are −1, −0.5, 0, +0.5, and +1.

Figure 3:
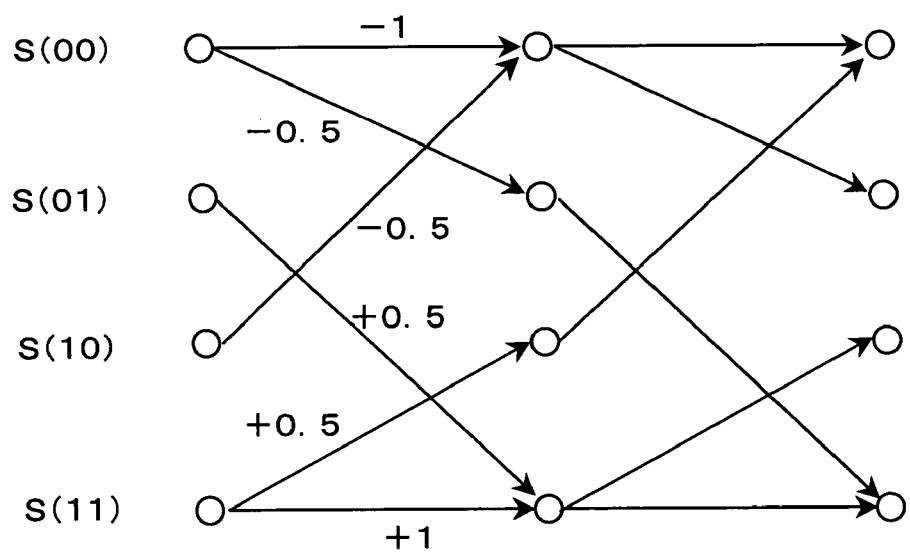
FIG. 3 is a schematic showing trellis lines.

FIG. 3 is a trellis diagram illustrating Viterbi decode which realizes data detection by PRML. In FIG. 3, S(00), S(01), S(10), and S(11) each represent a different state: for example, state S(00) means a 0 previous bit and a 0 current bit. A line linking a state to the other is termed a "branch," which represents a state transition: for example, the S(00)-S(01) branch represents a "001" bit pattern. Each branch is marked with a numeric value indicating an ideal sample level expected for that state transition: for example, the S(00)-S(00) branch represents a 000 bit pattern and therefore has an ideal sample level of −1 (the non-normalized sample level is 0). Note that the S(01)-S(10) and S(10)-S(01) branches are missing from the diagram. This is because the 010 and 101 bit patterns cannot occur due to the d=1 RLL.

In the trellis diagram, a "path" is formed by connecting continuous branches between the states. Every possible bit pattern is represented by a path in the diagram. The most likely path, or the "correct path," can be determined by comparing the waveform actually reproduced from the optical disc 1 with every ideal waveform derived from the paths to find the ideal waveform that is the "closest" to the reproduced waveform, that is, the one with the least Euclidean distance from the reproduced waveform.

A Viterbi decoding procedure based on a trellis diagram will be specifically described. At any given time, there are two paths merging at each of states S(00) and S(11), whereas there is a single path coming in to each of S(01) and S(10). Of the two paths merging at S(00) and S(11), retain the one with a less Euclidean distance between the ideal waveform and the reproduced waveform; this leaves four paths each terminating at a different one of the four states at any given time.

The square of the Euclidean distance between the ideal and reproduced waveforms for a path is termed the path metric. The path metric is calculated by summing up branch metrics for all branches making up the path (the branch metric is the square of the difference between the ideal sample level of the branch and the sample level of a reproduced waveform).

Thus, when a sample value of a reproduced waveform is received (i.e., when a reproduced signal is received), a survivor path is determined (i.e., a path with a greater path metric is eliminated) through the comparison of the magnitudes of the path metrics of the two paths merging at the same state; repeating this process results in the survivor path approaching the path with a minimum path metric. The survivor path thus determined is the correct path, according to which the data bit pattern recorded on the optical disc 1 is correctly reproduced.

The path memory length is defined as the number of state transitions which occur between the time when a reproduced signal is received and the time when a decoded bit pattern is output based on the determination of a correct path. Generally, the path memory length is sufficiently long for the survivor path to be determined.

Let us now consider conditions under which Viterbi decoding is correctly done. For the correct path to be ultimately chosen, the path metric must be smaller for the correct path than for other, error path every time a survivor path is determined. Accordingly, the difference in path metric between the two paths, one of which will be the survivor, decidedly indicates how likely the paths will be susceptible to errors. This path metric difference is the definition of the SAM.

To prevent errors from occurring in Viterbi decoding, the path metric difference produced by subtracting the path metric of the correct path from that of the error path must be greater than 0. Further, the greater the path metric difference, the less likely an error will occur. The Viterbi decoder 5 calculates the path metric difference for output as s(n).

Now, the reproducing operation by the optical disc reproducing device 20 configured as shown in FIG. 1 will be described.

First, the optical pickup 2 projects a light beam onto the optical disc 1. The resultant output from the optical pickup 2 is a waveform reproduced from the recorded marks on the optical disc 1. The reproduced waveform is translated to a reproduced signal pattern u(i,n) by the A/D converter 3. Receiving the reproduced signal pattern u(i,n), the FIR filter 4 performs waveform equalization on the pattern and outputs an equalized signal y(i−1,n). The equalized signal y(i−1,n) corresponds to the reproduced signal u(i−1,n) (the matched suffix "i−1" indicates the correspondence between the signals before and after the equalization). The equalized signal y(i−1,n) is given by $$y(i-1, n) = \sum_{k=0}^{2} c(k, n)u(i-k, n) \quad (2)$$

The expression shows that the equalized signal y(i−1,n) is calculated from convolution of the tap coefficient c(k,n) and the reproduced signal pattern u(i−k,n).

In other words, the FIR filter 4 generates the equalized signal pattern y(i−1,n) by sequentially associating the reproduced signals in the reproduced signal pattern u(i−k,n) with the multiple tap coefficients c(k,n) (k=0, 1, 2) and convolving the tap coefficients with the input signals associated with the tap coefficients.

As mentioned earlier, the Viterbi decoder 5 receives the equalized signal pattern y(i−1,n), and calculates and outputs the path metric difference s(n) and the decoded bit pattern b(i) which is the result of Viterbi decoding. In other words, the Viterbi decoder 5 decodes the reproduced signal pattern u(i,n) and produces the decoded bit pattern b(i) as the result. Besides, the Viterbi decoder 5 detects the path metric difference s(n) between the correct path determined as being the survivor path and the error path which fails to survive the correct path in Viterbi decoding based on the equalized signal pattern y(i−1,n).

Here, the path memory length delay circuits 6 is to correct the reproduced signal pattern u(i,n) with a delay equal to the path memory length in Viterbi decoding and a time difference L between the path metric difference s(n) and the decoded bit pattern b(i) for synchronization.

The specific patterns detector circuit 7 determines whether the decoded bit pattern b(i−4), b(i−3), . . . , b(i) match one of specific patterns 00111, 00011, 11000, and 11100. If there is a match, a match signal is sent to the tap coefficients update circuit 10. The specific patterns (detailed later) are bit patterns such that the path metric difference according to ideal waveform signal pattern assumed to constitute an ideal waveform for Viterbi decoding takes a pre-specified value. The specific patterns detector circuit 7 detects such a specific pattern in the decoded bit pattern b(i).

Receiving a match signal from the specific patterns detector circuit 7, the tap coefficients update circuit 10 corrects the tap coefficient c(k,n) according to the product of (a) the error {s(n)−ds} of the path metric difference s(n) from the Viterbi decoder 5 with respect to the target value ds from the target value register 8 and (b) a polynomial of the first order, {u(−2−k,n)+2u(−1−k,n)+u(−k,n)}, obtained by giving predetermined weights to the reproduced signal pattern u(i−k, n). In other words, the tap coefficients update circuit 10 adapts the equalization properties of the FIR filter 4 on the basis of the error {s(n)−ds} from the target value ds, which is the path metric difference s(n) actually detected in the Viterbi decoder 5. The tap coefficients update circuit 10 specifically evaluates Equation (1).

Figure 4:
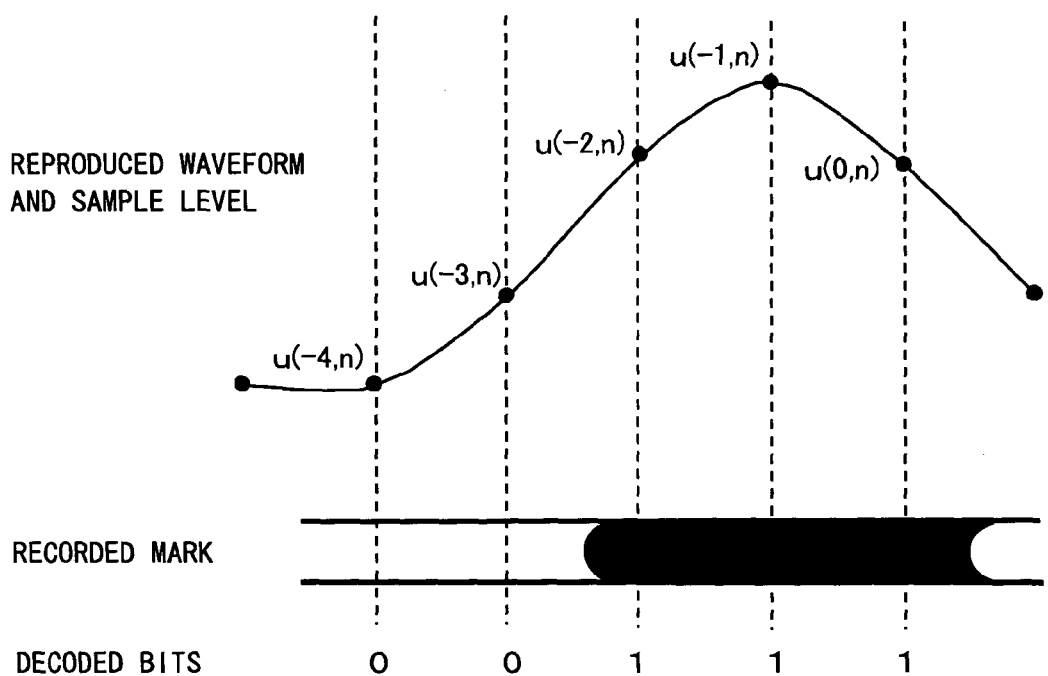
FIG. 4 is a schematic for illustrating a relationship among a decoded bit pattern "00111", a recorded mark, and a reproduced waveform and sample levels thereof.

Now, the relationship between the path metric difference s(n) and the reproduced signal pattern u(i−k,n) will be described in reference to FIG. 4. Suppose when 00111 is detected as the n-th decoded bit pattern which matches a specific pattern, the reproduced waveform obtained from the recorded marks corresponding to the decoded bit pattern is as shown in FIG. 4, where the corresponding reproduced signal pattern is u(−4,n), u(−3,n), u(−2,n), u(−1,n), and u(0,n). The path metric difference s(n) is obtained from the middle three signals y(−3,n), y(−2,n), and y(−1,n) in an equalized signal pattern y(−4,n), y(−3,n), y(−2,n), y(−1,n), and y (0,n) corresponding to the reproduced signal pattern u(−4,n), u(−3,n), u(−2,n), u(−1,n), and u(0,n) (see Equation (3) which will be detailed later)).

In Equation (1), μ indicates a step gain. If it is set to an appropriate value, the tap coefficient c(k,i) converges to a predetermined value with the repetition of such update operations. The plus or minus symbol (±) preceding the coefficient-correction term (the second term on the right side of Equation (1)) is determined depending on the specific pattern detected by the specific patterns detector circuit 7: it is "minus" for 00111 and 11100 and "plus" for 11000 and 00011.

The mean square error E[{s(n)−ds}$^2$] (E[ ] is an operator for an expectation), from the target value ds, of the path metric difference s(n) of an equalized signal output from the FIR filter 4 based on the value of the tap coefficient to which it ultimately converges with recursive updates of the tap coefficient according to Equation (1) is minimum. In this case, the error rate of the Viterbi-decoded bit is optimal.

Accordingly, when the Viterbi decoder 5 repeatedly detects the path metric difference s(n) between the correct path and the error path, one of which is the survivor, to proceed with the Viterbi decoding based on the equalized signal pattern y(i−1,n), the tap coefficients update circuit 10 updates the tap coefficient so that the mean square error E[{s(n)−ds}$^2$] (the mean square value of the errors s(n)−ds corresponding respectively to the path metric differences s(n)) approaches a minimum value. As will be detailed later, to update the tap coefficient, the actual mean square error is not necessarily calculated: the mean square error only needs to approach a minimum value as a result of recursive updates.

The following will describe in detail reasons why a minimum mean square error E[{s(n)−ds}$^2$] produces an optimal error rate and why the updating by the tap coefficients update circuit 10 produces a minimum E[{s(n)−ds}$^2$].

First, reasons will be given why a minimum mean square error E[{s(n)−ds}$^2$] produces an optimal error rate.

Figure 5A:
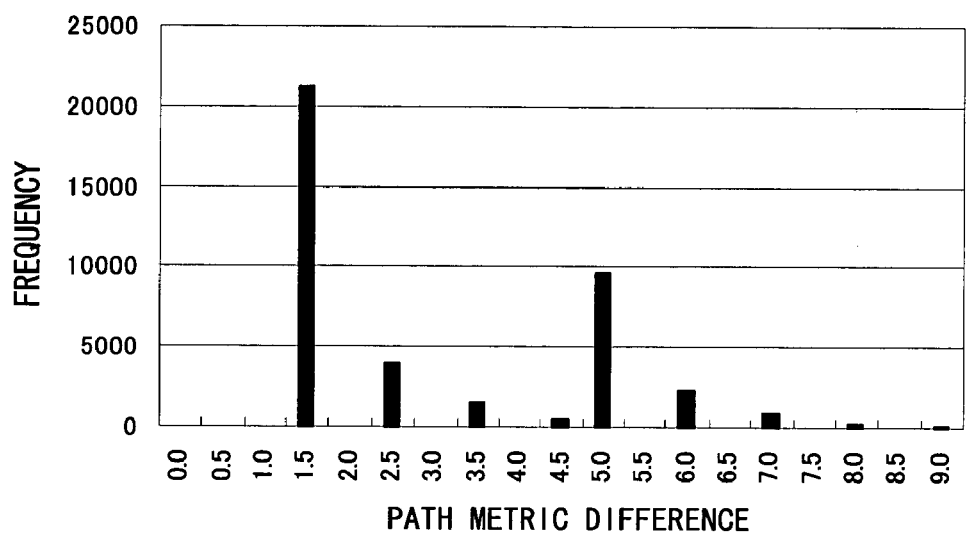
FIG. 5(a) is a histogram of a path metric difference from an ideal waveform.

FIG. 5(a) is a histogram of a path metric difference from a totally noise-free ideal waveform assumed for PR(1,2,1) properties on the basis of the (1,7) RLL code bit pattern. From FIG. 5(a), it would be understood that the path metric difference takes discrete values (ideal values) of 1.5, 2.5, 3.5, 4.5, 5, 6, 7, 8, 9, . . . . The ideal values vary because the path metric difference of an error path emanating from the same state and terminating on the same state as the correct path corresponding to an ideal waveform in a trellis diagram differs from one bit pattern to another.

FIG. 6 shows a relationship between the ideal values of the path metric difference and bit patterns corresponding to the ideal values. The frequencies of the ideal values vary because the number of bit patterns vary from one ideal value to another, and the bit patterns occur at different probabilities in (1,7) RLL coding.

Figure 5B:
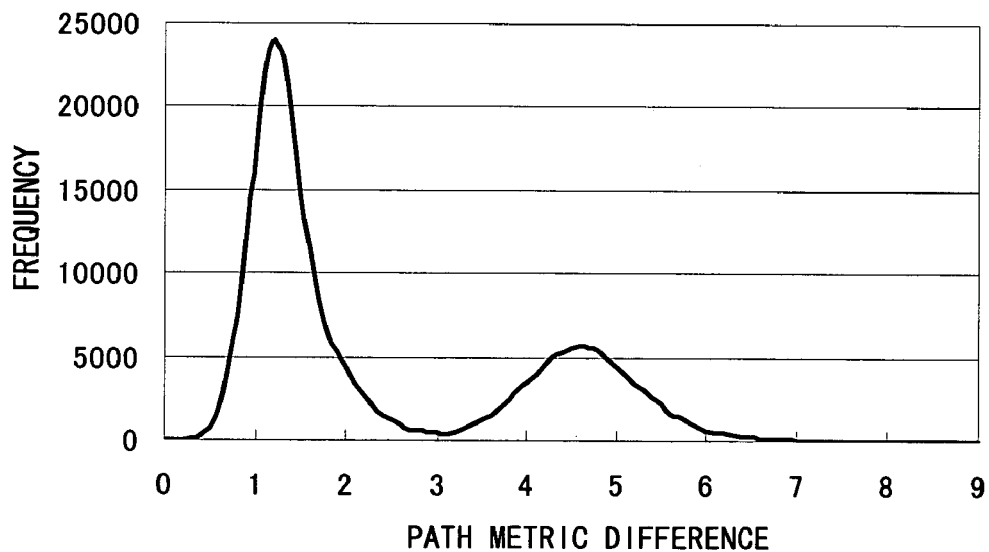
FIG. 5(b) is a histogram of a path metric difference from an actual reproduced signal.
Figure 7:
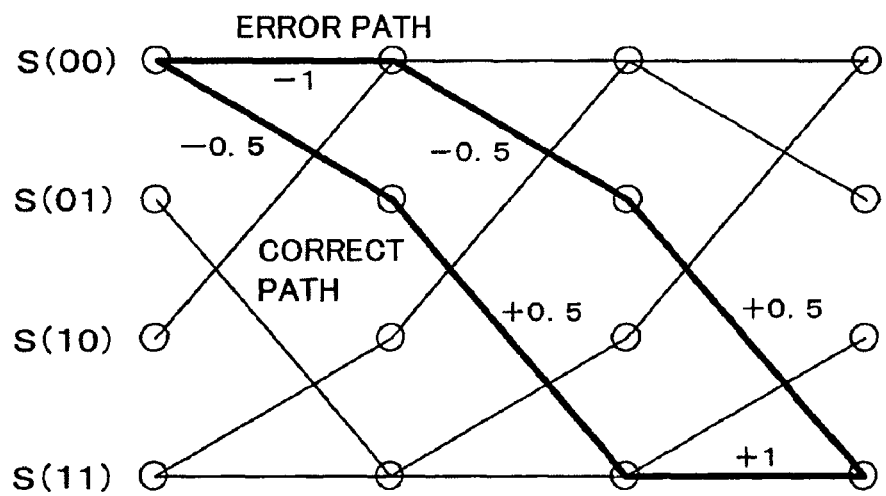
FIG. 7 is a schematic showing trellis lines of Viterbi decoding corresponding to the bit pattern "00111".

Meanwhile, the examination of a histogram of path metric differences for a reproduced signal for a bit pattern actually recorded on an optical disc according to the (1,7) RLL coding reveals as shown in FIG. 5(b) that the overall distribution of the path metric differences is the summation of secondary distributions each of which has a heavy concentration around the associated ideal value. This is because of the presence of various kinds of noise in the reproduced signal.

Accordingly, by determining the equalization properties so as to reduce the deviation of the path metric differences for a reproduced signal with respect to the ideal values, the probability of the path metric difference, a subtraction of the path metric for a correct path from the path metric for an error path, being less than 0 can be reduced, and the error rate can be lowered in a good manner. Specifically, obtain ideal values for the path metric differences corresponding to the decoded bit patterns from FIG. 6 and minimize the mean square error E[{s(n)−ds}$^2$] with the ideal values as the target values.

Further, taking into consideration that the path metric difference must be greater than 0 to prevent error occurrences in Viterbi decoding, it would be safely assumed that the error rate can be optimally reduced if the equalization properties are determined so as to reduce the deviation for only the ideal value of 1.5 at which the path metric difference is most likely to cause an error. In other words, detect those four bit patterns for which the ideal value for the path metric difference is 1.5, i.e., 00111, 00011, 11000, 11100 (see FIG. 6), and minimize the mean square errors E[{s(n)−ds}$^2$] of the path metric difference s(n) from the target value ds=1.5 corresponding to the bit patterns. Note that the bit patterns corresponding to the ideal value (specified value) under consideration as above constitute specific patterns.

In this manner, when the specific patterns detector circuit 7 detects one of the specific patterns, the tap coefficients update circuit 10 updates the tap coefficient on the basis of the error of the path metric difference corresponding to that specific pattern. Besides, the target value register 8 sets the target value ds to a minimum one of the ideal values of the path metric difference; thus, the equalization properties can be optimized only on a pattern which will likely cause an error in Viterbi decoding.

Now, the following will describe reasons why the updating by the tap coefficients update circuit 10 produces a minimum E[{s(n)−ds}$^2$].

Suppose 00111 is detected as the n-th bit pattern matching a specific pattern. In this case, in the trellis diagram depicting Viterbi decoding in FIG. 7, the correct path is " . . . -S(00)-S(01)-S(11)-S(11)," and the error path merging with the correct path at the last state S(11) (the one on the far right in FIG. 7) is almost always the path " . . . -S(00)-S(00)-S(01)-S(11)" for which the ideal waveform is the nearest to that of the correct path.

In this case, the sample levels on the ideal waveform are (−0.5, +0.5, +1) for the correct path and (−1, −0.5, +0.5) for the error path. Therefore, using the equalized signals y(−3, n), y(−2,n), y(−1,n) corresponding to these, the path metric difference s(n) in this case can be approximately, but simply given by $$s(n) = \{y(-3, n) - (-1)\}^2 + \{y(-2, n) - (-0.5)\}^2 + \{y(-1, n) - \quad (3)$$
$$(+0.5)\}^2 - \{y(-3, n) - (-0.5)\}^2 - \{y(-2, n) - (+0.5)\}^2 -$$
$$\{y(-1, n) - (+1)\}^2$$
$$= y(-3, n) + 2y(-2, n) + y(-1, n)$$

Using Equation (2), Equation (3) is rewritten:

$$s(n) = \sum_{k=0}^{2} c(k, n)\{u(-2-k, n) + 2u(-1-k, n) + u(-k, n)\} \quad (4)$$

Accordingly, the mean square, $\epsilon = E[e(n)^2]$, of errors $e(n) = s(n) - ds$ (mean square error) of the path metric difference s(n) from the target value ds is given by $$\varepsilon = E[\{s(n) - ds\}^2] \quad (5)$$
$$= E[s(n)^2] - 2dsE[s(n)] + ds^2$$
$$= \sum_{k=0}^{2}\sum_{m=0}^{2} c(k, n)c(m, n)E[\{u(-2-k) + 2u(-1-k) + u(-k)\}$$
$$\{u(-2-m) + 2u(-1-m) + u(-m)\}]\cdot$$
$$2ds\sum_{k=0}^{2} c(k, n)E[\{u(-2-k) + 2u(-1-k) + u(-k)\}] + ds^2$$

For simplicity in description, "u(i,n)" is written "u(i)". Equation (5) shows that the mean square error $\epsilon$ is a quadratic function of the tap coefficient, that is, a bowl-like curved surface having a single minimum point. Therefore, moving the tap coefficient in an opposite direction to the current gradient (differential value) of Equation (5) results in the mean square error $\epsilon$ gradually approaching the minimum point.

Partially differentiating the mean square error $\epsilon$ with respect to the tap coefficient c(k,n) to obtain the gradient of Equation (5), we get $$\partial\varepsilon/\partial c(k, n) = -2E[u(-2-k) + 2u(-1-k) + u(-k)]ds + \quad (6)$$
$$2\sum_{m=0}^{2} c(m, n)E[\{u(-2-k) + 2u(-1-k) + u(-k)\}$$
$$\{u(-2-m) + 2u(-1-m) + u(-m)\}]$$

Substituting ds=s(n)−e(n) and rearranging Equation (6), we get $$\partial\varepsilon/\partial c(k,n) = 2E[e(n)\{u(-2-k,n) + 2u(-1-k,n) + u(-k,n)\}] \quad (7)$$

To describe the gradient, tap coefficient, and reproduced signal pattern collectively, let us use vector expressions:

$$\nabla(n) = \frac{1}{2}\begin{pmatrix} \partial\varepsilon/\partial c(0, n) \\ \partial\varepsilon/\partial c(1, n) \\ \partial\varepsilon/\partial c(2, n) \end{pmatrix} \quad (8)$$

$$C(n) = \begin{pmatrix} c(0, n) \\ c(1, n) \\ c(2, n) \end{pmatrix} \quad (9)$$

$$U(i, n) = \begin{pmatrix} u(i-2, n) \\ u(i-3, n) \\ u(i-4, n) \end{pmatrix} \quad (10)$$

The multiplier ½ in the expression of the gradient vector $\nabla(n)$ is not essential, but included only for descriptive purposes in relation to mathematical expressions introduced later. As the tap coefficient vector C(n) is progressively corrected in the direction opposite to the gradient vector $\nabla(n)$, the mean square error $\epsilon$ approaches the minimum point; therefore, assuming that the step gain is μ (positive constant value), the tap coefficient correct algorithm is based on the equation:

$$C(n+1) = C(n) - \mu\nabla(n) \quad (11)$$

From Equation (7), the gradient vector $\nabla(n)$ is obtainable by averaging the products of the errors of the path metric differences s(n) from the target value ds and the linear combination of reproduced signal vectors and is given by $$\nabla(n) = E[\{s(n) - ds\}\{U(0,n) + 2U(1,n) + U(2,n)\}] \quad (12)$$

However, the mean value, E[{s(n)−ds}{U(0,n)+2U(1,n)+U(2,n)}], is difficult to calculate in real time. It is more practical to use a momentary estimate of the mean value, that is, the products of the errors of the path metric differences s(n) from the target value ds and the linear combination of reproduced signal vectors and to use $$\nabla(n) = \{s(n) - ds\}\{U(0,n) + 2U(1,n) + U(2,n)\}. \quad (13)$$

It is theoretically proved that the value to which the tap coefficient converges in the latter does not significantly differ from that derived from the averaging as in (12).

Details will be omitted regarding the other bit patterns 00011, 11100, and 11000 where the ideal value for the path metric difference is 1.5, since similar discussions to the one above apply to these cases. It should be noted however that the equation, s(n)=y(−3,n)+2y(−2,n)+y(−1,n), for the foregoing case holds also true in the case of 11100, and hence the two cases produce the same results, whereas s(n)=−{y(−3,n)+2y(−2,n)+y(−1,n)} holds true in the cases of 00011 and 11000 and $\nabla(n)$ is given by $\nabla(n) = -\{s(n)-ds\}\{U(0,n)+2U(1,n)+U(2,n)\}$. To sum up the foregoing discussion, the mean square error $\epsilon$ of the path metric difference with respect to the target value can be minimized by determining the gradient vector given as (a) $\nabla(n) = \{s(n)-ds\}\{U(0,n)+2U(1,n)+U(2,n)\}$ for 00111 and 11100

(b) $\nabla(n) = -\{s(n)-ds\}\{U(0,n)+2U(1,n)+U(2,n)\}$ for 00011 and 11000 and then updating the tap coefficient vector according to Equation (11).

Accordingly, the tap coefficients update circuit 10 adapts the equalization properties of the FIR filter 4 by updating the tap coefficients so as to minimize a function, $e(n)^2 = \{s(n) -$ ds$\}^2$, calculated from the variable tap coefficients, which is the square of the error e(n), instead of the mean square error $\epsilon$=E[e(n)$^2$] calculated from the variable tap coefficients.

To this end, the tap coefficients update circuit 10 updates the tap coefficients c(k,n) to c(k,n+1) by subtracting from the tap coefficients c(k,n) the gradient, {s(n)−ds}{u(−2−k,n)+2u(−1−k,n)+u(−k,n)}, multiplied by a constant value. The gradient is obtainable by partially differentiating the function, e(n)$^2$={s(n)−ds}$^2$, with respect to the tap coefficient c(k,n) (see Equation (1)).

The tap coefficients update circuit 10 is arranged to perform, as the calculation of the gradient, the multiplication of the error e(n)={s(n)−ds} with a weighted sum, {u(−2−k,n)+2u(−1−k,n)+u(−k,n)}, of one of the reproduced signal patterns, u(−4,n), u(−3,n), u(−2,n), u(−1,n), u(0,n), which constitutes a path corresponding to the path metric difference s(n) having the error e(n). The weights are predetermined depending on which one of the tap coefficients c(0,n), c(1,n), and c(2,n) is to be updated and also on what partial response properties the Viterbi decoder 5 assumes. Arranging the tap coefficients update circuit 10 to perform the calculation in this manner enables the calculation of the gradient and the updating of the tap coefficient through a combination of simple calculations, such as additions and multiplications.

So far, the path metric difference s(n) has been approximately, but simply calculated according to s(n)=y(−3,n)+2y(−2,n)+y(−1,n) to fulfill requirements in theoretical development. Alternatively, the path metric difference s(n) according to which {s(n)−ds} is calculated in the algorithm may be obtained from the path metric difference between the two paths merging in an actual Viterbi decoding circuit, for convenience in circuit packaging.

Figure 8:
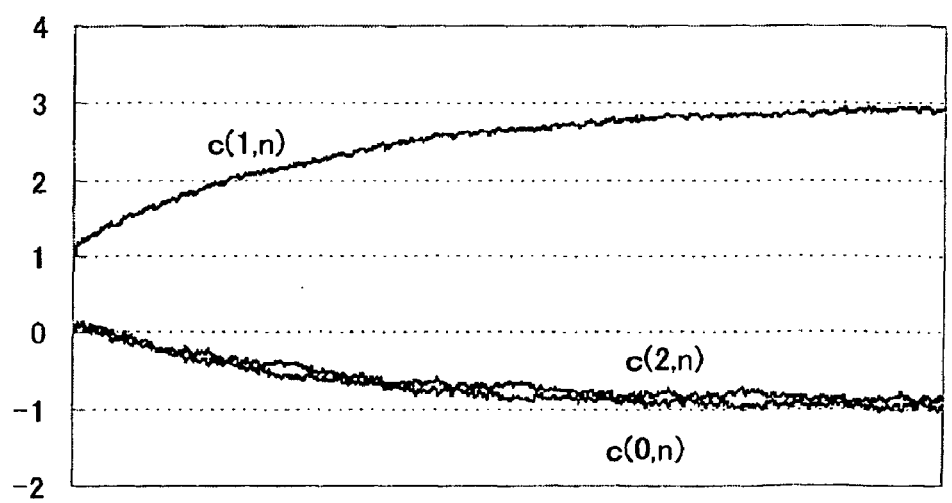
FIG. 8 is a graph showing an actual measurement result of how tap coefficients of the optical disc of FIG. 1 converge.

FIG. 8 is a graph showing how tap coefficients converged in actual adaptive equalization using the optical disc reproducing device 20. For better illustration of the mechanism, the initial values were set to c(0,0)=0, c(1,0)=1, and c(2,0)=0. As can be seen in FIG. 8, the tap coefficients converged to predetermined values. The ultimate value was about −1 for c(0,n) and c(2,n) and about +3 for c(1,n). The bit error rate measurement under these conditions was 2×10$^{-6}$, which was extremely good.

Figure 14:
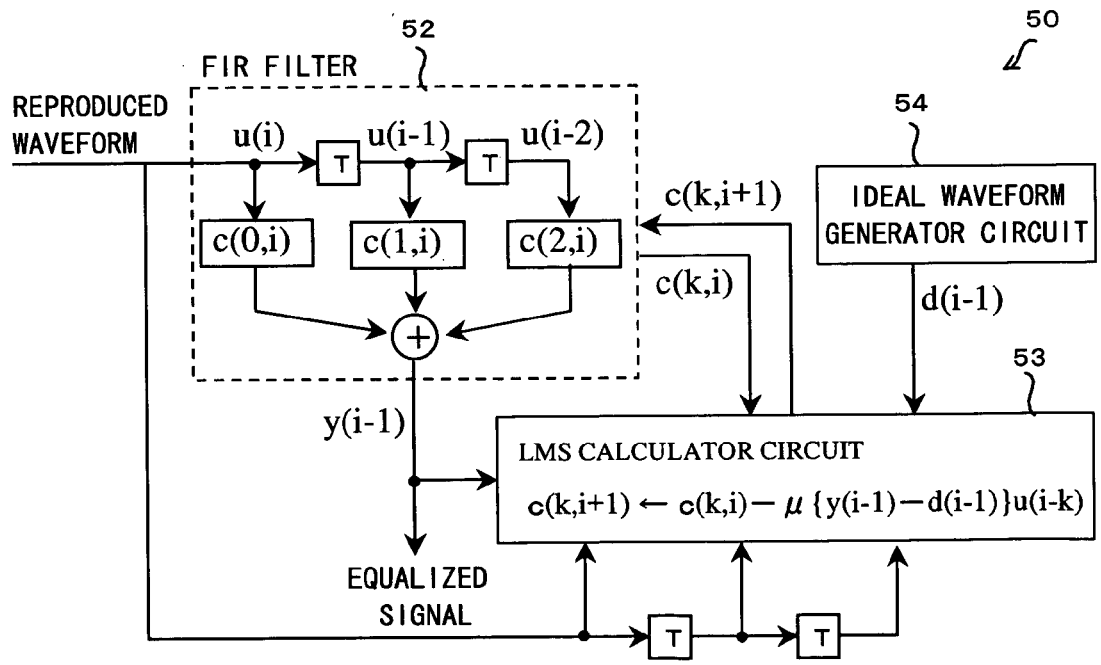
FIG. 14 is a schematic showing an arrangement of a waveform equalizing device based on an LMS scheme.

For comparative purposes, tap coefficients were calculated according to a conventional LMS scheme. The waveform equalizing device 50 was used (see FIG. 14), and a PR(1,2,1) ideal waveform was taken as the target waveform. c(0,n) and c(2,n) converged to about −1, and c(1,n) converged to about +2.8. The error rate measurement under these conditions was about 3×10$^{-5}$.

These results verify that the adaptive equalization of the present invention maintains a low error rate when it is applied to a reproduction system having unknown frequency characteristics.

As discussed so far, if the equalization properties are adapted so as to minimize the mean square error of the path metric difference from the target value, the deviation of the path metric difference can be minimized on the histogram of the path metric difference, and the error rate can be maintained low.

Besides, it is preferred if the equalization is adapted when a specific pattern where the ideal value for the path metric difference becomes equal to the predetermined value is detected among decoded bit patterns. When this is the case, the equalization properties can be optimized only on a bit pattern which will likely cause an error. The error rate can be further reduced. Especially, if the least one(s) of the path metric differences calculated for ideal waveforms corresponding to all possible bit patterns is/are used as the predetermined value(s), the deviation can be reduced only for the path metric differences which will likely cause an error. The error rate can be further reduced.

The equalization may be adapted at other times than when a specific pattern where the ideal value for the path metric difference becomes equal to the predetermined value is detected among decoded bit patterns: e.g., every time the Viterbi decoder 5 outputs a decoded pattern which is a bit pattern corresponding to a surviving correct path in Viterbi decoding. To this end, the target value register 8 registers an ideal value for the path metric difference corresponding to the decoded pattern output from the Viterbi decoder 5 as the target value ds for the path metric difference corresponding to the decoded pattern output from the Viterbi decoder 5. In this case, it would be sufficient if the target value register 8 holds the variety of patterns in FIG. 6 which are assumed decoded patterns and the ideal values of the path metric differences corresponding to the patterns.

Besides, in the description so far, an ideal value has been registered as the target value ds. Alternatively, considering the distribution properties of the actual path metric difference, the ideal value may be suitably corrected before registering as the target value ds.

In the description above, the Viterbi decoder 5 has been arranged to output the path metric difference s(n) and the decoded bit pattern b(i) which is the result of Viterbi decoding. The output of the decoded bit pattern b(i) is delayed from the input of the reproduced signal u(i,n) by as much as the path memory length in Viterbi decoding. This ends up in the tap coefficient update by the tap coefficients update circuit 10 being delayed as much as the path memory length.

The decoded bit pattern to be fed to the specific patterns detector circuit 7 is used for the detection of a specific pattern. Detection errors in the decoded bit pattern, if any, have no significant adverse effects and pose no problems in practice provided that the errors are not numerous and the step gain μ is sufficiently small. Therefore, the decoded bit pattern fed to the specific patterns detector circuit 7 can have a higher error rate than the error rate (1×10$^{-4}$ or lower) required for the decoding of an ordinary information data bit pattern.

Accordingly, the path memory length in the Viterbi decoding generating a decoded bit pattern to be fed to the specific patterns detector circuit 7 may be shorter than that in the Viterbi decoding generating an information data bit pattern. When this is the case, the decoded bit pattern b(i) fed to the specific patterns detector circuit 7 generated by the Viterbi decoder 5, through Viterbi decoding using a shorter path memory length than that for the Viterbi decoding generating an information data bit pattern. The delay in the tap coefficient update in the tap coefficients update circuit 10 is reduced. In adaptation, this results in reduced delay and improved response.

In the description so far, the ideal sample levels have been normalized to ±1 using a reproduction system which is a combination of the PR(1,2,1) properties and the (1,7) RLL coding; the path metric difference therefore takes a minimum ideal value of 1.5. Expressing this in general terms, in the case of a PRML reproduction system of which the PR properties are expressed as an impulse response (a, b, a), the path metric difference has a minimum ideal value of 2a$^2$+b$^2$. In the example above, since a=0.5 and b=1, the minimum ideal value for the path metric difference is 2×0.5$^2$+1$^2$=1.5.

Therefore, when the original bit pattern for the reproduced signal pattern is modulated by d=1 RLL coding, the Viterbi decoder 5 assumes an impulse response (a, b, a) for an isolated mark, and the RLL for a reproduced signal pattern is taken into consideration, the target value register 8 sets the target value ds to $(2a^2+b^2)$, an the specific patterns detector circuit 7 detects specific patterns, 00111, 00011, 11000, and 11100.

Besides, in the description so far, the FIR filter 4 has been supposed to have three taps (the number of taps M=3) for convenience in description; however this is not the only possibility. The present invention is of course similarly applicable to filters of higher orders. Details are omitted regarding the typical number of filters M in a PRML reproduction system of which the PR properties are expressed as an impulse response (a, b, a). Here, we only present the conclusion: calculate the gradient vector for the M-order tap coefficient vector $C(n)=[c(0,n), c(1,n), \ldots c(M-1,n)]$ where $c(k,n)$ is the tap coefficient of the k-th tap, the reproduced signal vector $u(i,n)=[u(i-2,n), u(i-3,n), \ldots, u(i-M-1,n)]$ where $u(-M-1,n), u(-M,n), \ldots, u(0,n)$ are a pattern of M+2 reproduced signals corresponding to the n-th specific pattern, the target value ds, the path metric difference s(n), and (a) the gradient vector $\nabla(n)=\{s(n)-ds\}\{aU(0,n)+bU(1,n)+aU(2,n)\}$ when 00111 or 11100 is detected and (b) the gradient vector $\nabla(n)=-\{s(n)-ds\}\{aU(0,n)+bU(1,n)+aU(2,n)\}$ when 00011 or 11000 is detected, and update the tap coefficient vector according to Equation (11).

Besides, the foregoing description assumed a PR(1,2,1) PRML, or PR(a, b, a) PRML in generic expression, where the waveform interference width is 3T. The following will briefly deal with 2T and 4T waveform interference widths.

First, the PRML will be described for a 2T waveform interference width. In this case, the PRML assumes an impulse response given by PR(a, a). We will suppose here that the modulation method of the reproduced signal does not involve d limitation (no RLL codes).

Since the waveform interference width is 2T, the trellis diagram will show two states: S(0) and S(1). A path metric difference is calculated for a correct path "v1, v2, v3" and an error path "v1, v2', v3" (v1, v2, and v3 indicate either a 0 or a 1, and v2' the invert of v2). The correct path has sequential ideal waveform values of av1+av2 and av2+av3, whereas the error path has sequential ideal waveform values of av1+av2' and av2'+av3. The ideal value for the path metric difference is $$(av1+av2-av1-av2')^2+(av2+av3-av2'-av3)^2 = \qquad (14)$$
$$2a^2(v2-v2')^2 = 2a^2.$$

The result shows the ideal value for the path metric difference is invariably $2a^2$.

Therefore, when the Viterbi decoder 5 assumes an (a, a) impulse response for an isolated mark, the target value register 8 sets the target value ds to $2a^2$.

Figure 9:
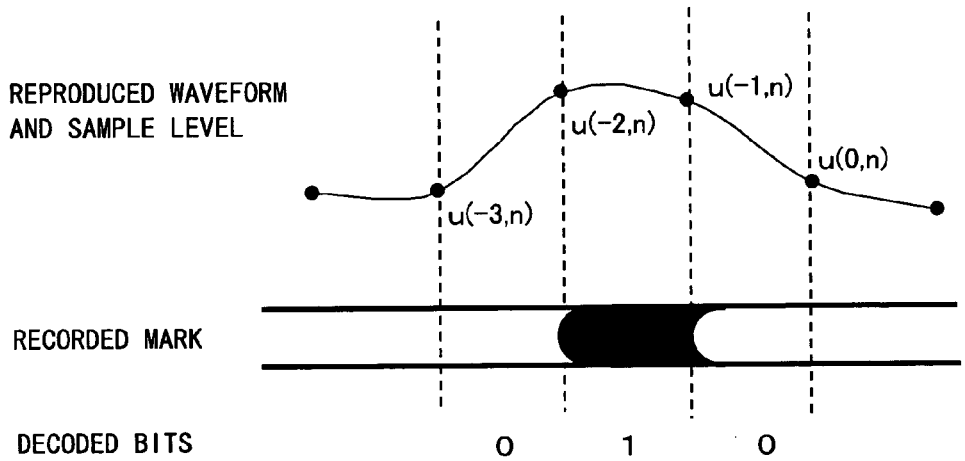
FIG. 9 is a schematic for illustrating a relationship among a decoded bit pattern "010", a recorded mark, and a reproduced waveform and sample levels thereof.

FIG. 9 shows a relationship between the path metric differences s(n) and the digital reproduced signals u(i−k,n). Note that FIG. 9 deals with a case where the number of taps (the order of the tap coefficient vector) M=3. Suppose "010" is detected as the n-th decoded bit pattern matching a specific pattern, a reproduced waveform reproduced from the recorded marks corresponding to the decoded bit pattern is as shown in FIG. 9, and the corresponding reproduced signal pattern is u(−3,n), u(−2,n), u(−1,n), and u(0,n). Generally, when the number of taps is M, there are (M+1) corresponding reproduced signal patterns: $u(-M,n), \ldots, u(0,n)$. The path metric difference s(n) is approximately, but simply calculated from the middle two, y(−2,n) and y(−1,n), of the equalized signals y(−3,n), y(−2,n), y(−1,n), y (0,n) corresponding to the reproduced signal pattern u(−3,n), u(−2,n), u(−1,n), u(0,n), as follows:

$$s(n) = \{y(-2,n) - (av1+av2')\}^2 + \{y(-1,n) - (av2'+av3)\}^2 - \qquad (15)$$
$$\{y(-2,n) - (av1+av2)\}^2 - \{y(-1,n) - (av2+av3)\}^2$$
$$= (v2-v2')\{2a(y(-2,n)+y(-1,n)) - 2a^2(1+v1+v3)\}$$

where y(−2,n), y(−1,n), and the reproduced signal are related by the following equations:

$$y(-2,n) = \sum_{k=0}^{2} c(k,n)u(-1-k,n) \qquad (16)$$

$$y(-1,n) = \sum_{k=0}^{2} c(k,n)u(-k,n) \qquad (17)$$

Further description is omitted, since in exactly the same way as with PR(1,2,1) is derived an algorithm to calculate a gradient vector $\nabla(n)$ by partially differentiating with respect to the tap coefficient the mean square, $\epsilon=E[e(n)^2]$, of the error $e(n)=s(n)-ds$ of s(n) from the target value ds and correct the tap coefficient vector C(n) in the direction opposite to the gradient vector $\nabla(n)$.

The ultimate algorithm differs from the case of PR(1,2,1) in the gradient vector $\nabla(n)$ changes in accordance with the bit pattern as follows because the approximately, but simply calculated path metric difference s(n) takes the foregoing form:

(a) $\nabla(n)=\{s(n)-ds\}\{U(0,n)+U(1,n)\}$ for 010, 011, 110, or 111, and (b) $\nabla(n)=-\{s(n)-ds\}\{U(0,n)+U(1,n)\}$ for 000, 001, 100, or 101.

The reproduced signal vector is given by $u(i,n)=[u(i-1,n), u(i-2,n), \ldots, u(i-M,n)]$ where $u(-M,n), u(-M+1,n), \ldots, u(0,n)$ are a pattern of (M+1) reproduced signals corresponding to the n-th specific pattern.

Next, the PRML will be described for a 4T waveform interference width. In this case, the PRML assumes an impulse response given by PR(a, b, b, a). We will suppose here that the modulation method of the reproduced signal involves d=1 RLL coding, in other words, a minimum mark length of 2T.

Since the waveform interference width is 4T, the trellis diagram will show 6 states: S(000), S(001), S(011), S(100) S(110), and S(111). S(010) and S(101) do not exist because of the d=1 limitation. A minimum ideal value for a path metric difference is given by eight bit patterns by which the error path merges with the correct path with the least number of state transitions: "x000110," "x000111," "x001110," "x001111," "x110000," "x110001," "x111000," and "x111001" where "x" indicates that the bit is either 0 or 1.

Supposing that the correct paths corresponding to these bit patterns are expressed "v1, v2, v3, v4, v5, v6, v7," the error path is v1, v2, v3, v4', v5, v6, v7 (v1 to v7 indicate either a 0 or a 1, and v4' the invert of v4). The ideal waveform values for the correct path are av1+bv2+bv3+av4, $av2+bv3+bv4+av5$, $av3+bv4+bv5+av6$, $av4+bv5+bv6+av7$, sequentially. The ideal waveform values for the error path are $av1+bv2+bv3+av4'$, $av2+bv3+bv4'+av5$, $av3+bv4'+bv5+av6$, and $av4'+bv5+bv6+av7$, sequentially. Therefore, the ideal value for the path metric difference calculated as follows:

$$(av1+bv2+bv3+av4-av1-bv2-bv3-av4')^2 + \qquad (18)$$
$$(av2+bv3+bv4+av5-av2-bv3-bv4'-av5)^2 +$$
$$(av3+bv4+bv5+av6-av3-bv4'-bv5-av6)^2 +$$
$$(av4+bv5+bv6+av7-av4'-bv5-bv6-av7)^2 =$$
$$2(a^2+b^2)(v2-v2')^2 = 2(a^2+b^2).$$

Therefore, when the modulation method of the original bit pattern for the reproduced signal pattern is d=1 RLL coding, the Viterbi decoder 5 assumes an (a, b, b, a) impulse response for an isolated mark, a reproduced signal pattern RLL is under consideration, the target value register 8 sets the target value ds to $2(a^2+b^2)$, and the specific patterns detector circuit 7 detects specific patterns 000110, 000111, 001110, 001111, 110000, 110001, 111000, and 111001.

Figure 10:
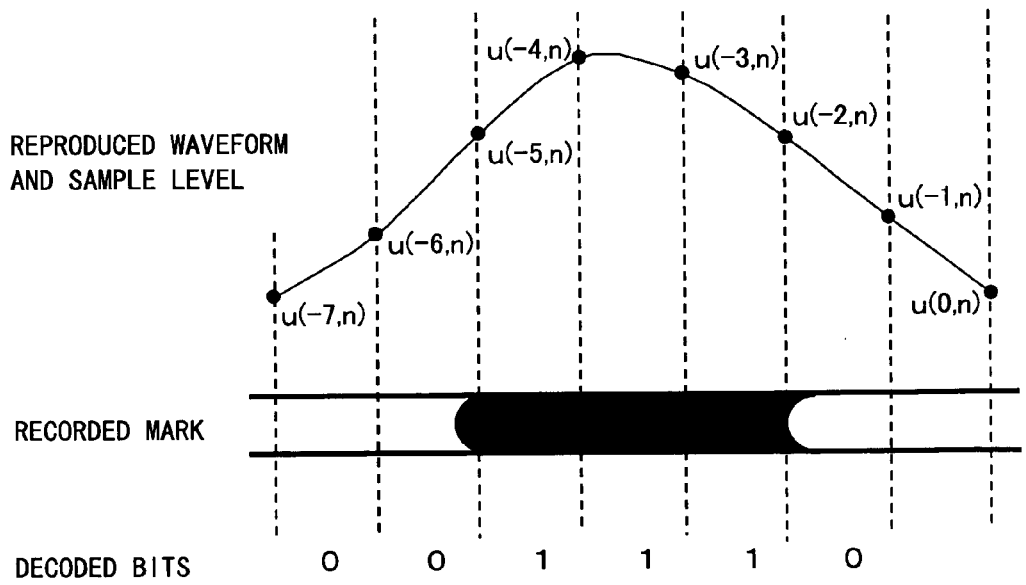
FIG. 10 is a schematic for illustrating a relationship among a decoded bit pattern "001110", a recorded mark, and a reproduced waveform and a sample level thereof.

FIG. 10 shows a relationship between the path metric difference s(n) and the digital reproduced signal u(i−k,n). Note that FIG. 10 deals with a case where the number of taps (the order of the tap coefficient vector) M=5. Suppose "001110" is detected as the n-th decoded bit pattern matching a specific pattern, a reproduced waveform reproduced from the recorded mark corresponding to the decoded bit pattern is as shown in FIG. 10, and the corresponding reproduced signal pattern is u(−7,n), u(−6,n), u(−5,n), u(−4, n), u(−3,n), u(−2,n), u(−1,n), and u(0,n). Generally, when the number of taps is M, there are (M+3) corresponding reproduced signal patterns: u(−M−2,n), . . . , u(0,n). The path metric difference s(n) is approximately, but simply calculated from the four, y(−5,n), y(−4,n), y(−3,n), y(−2,n), of the equalized signals y(−7,n), y(−6,n), y(−5,n), y(−4,n), y(−3,n), y(−2,n), y(−1,n), y (0,n) corresponding to the reproduced signal pattern u(−7,n), u(−6,n), u(−5,n), u(−4,n), u(−3,n), u(−2,n), u(−1,n), u(0,n), as follows:

$$s(n) = \{y(-5,n) - (av1+bv2+bv3+av4')\}^2 + \qquad (19)$$
$$\{y(-4,n) - (av2+bv3+bv4'+av5)\}^2 +$$
$$\{y(-3,n) - (av3+bv4'+bv5+av6)\}^2 +$$
$$\{y(-2,n) - (av4'+bv5+bv6+av7)\}^2 -$$
$$\{y(-5,n) - (av1+bv2+bv3+av4')\}^2 -$$
$$\{y(-4,n) - (av2+bv3+bv4+av5)\}^2 -$$
$$\{y(-3,n) - (av3+bv4+bv5+av6)\}^2 -$$
$$\{y(-2,n) - (av4+bv5+bv6+av7)\}^2$$
$$= (v4-v4')\{2(ay(-5,n)+by(-4,n)+by(-3,n)+$$
$$ay(-2,n)) - 2a^2(v1+v7) - 4ab(v2+v6) -$$
$$2b(2a+b)(v3+v5)\}$$

where y(−5,n), y(−4,n), y(−3,n), y(−2,n) are related to the reproduced signal by the following equations:

$$y(-5, n) = \sum_{k=0}^{4} c(k,n)u(-3-k,n) \qquad (20)$$

$$y(-4, n) = \sum_{k=0}^{4} c(k,n)u(-2-k,n) \qquad (21)$$

$$y(-3, n) = \sum_{k=0}^{4} c(k,n)u(-1-k,n) \qquad (22)$$

$$y(-2, n) = \sum_{k=0}^{4} c(k,n)u(-k,n) \qquad (23)$$

Further description is omitted, since in exactly the same way as with PR(1,2,1) is derived an algorithm to calculate a gradient vector ∇(n) by partially differentiating with respect to the tap coefficient the mean square, $\epsilon = E[e(n)^2]$, of the error e(n)=s(n)−ds of s(n) from the target value ds and correct the tap coefficient vector C(n) in the direction opposite to the gradient vector ∇(n).

The ultimate algorithm differs from the case of PR(1,2,1) in the gradient vector ∇(n) changes in accordance with the bit pattern as follows because the approximately, but simply calculated path metric difference s(n) takes the foregoing form:

(a) ∇(n)={s(n)−ds}{aU(0,n)+bU(1,n)+bU(2,n)+aU(3,n)} for 001110, 001111, 111000, or 111001, and (b) ∇(n)=−{s(n)−ds}{aU(0,n)+bU(1,n)+bU(2,n)+aU(3, n)} for 000110, 000111, 110000, or 110001.

The reproduced signal vector is given by u(i,n)=[u(i−3,n), u(i−4,n), . . . , u(i−M−2,n)] where u(−M−2,n), u(−M−1,n), . . . , u(0,n) are a pattern of (M+3) reproduced signals corresponding to the n-th specific pattern.

The description has so far discussed PR(a, a), PR(a, b, a), and PR(a, b, b, a) PRML methods. The present invention is applicable to other PRML schemes without departing from the spirit and the scope of the invention. Besides, the description so far employed (1,7) RLL coding as d=1 RLL coding. This is not of course the only possibility.

Embodiment 2

Figure 11:
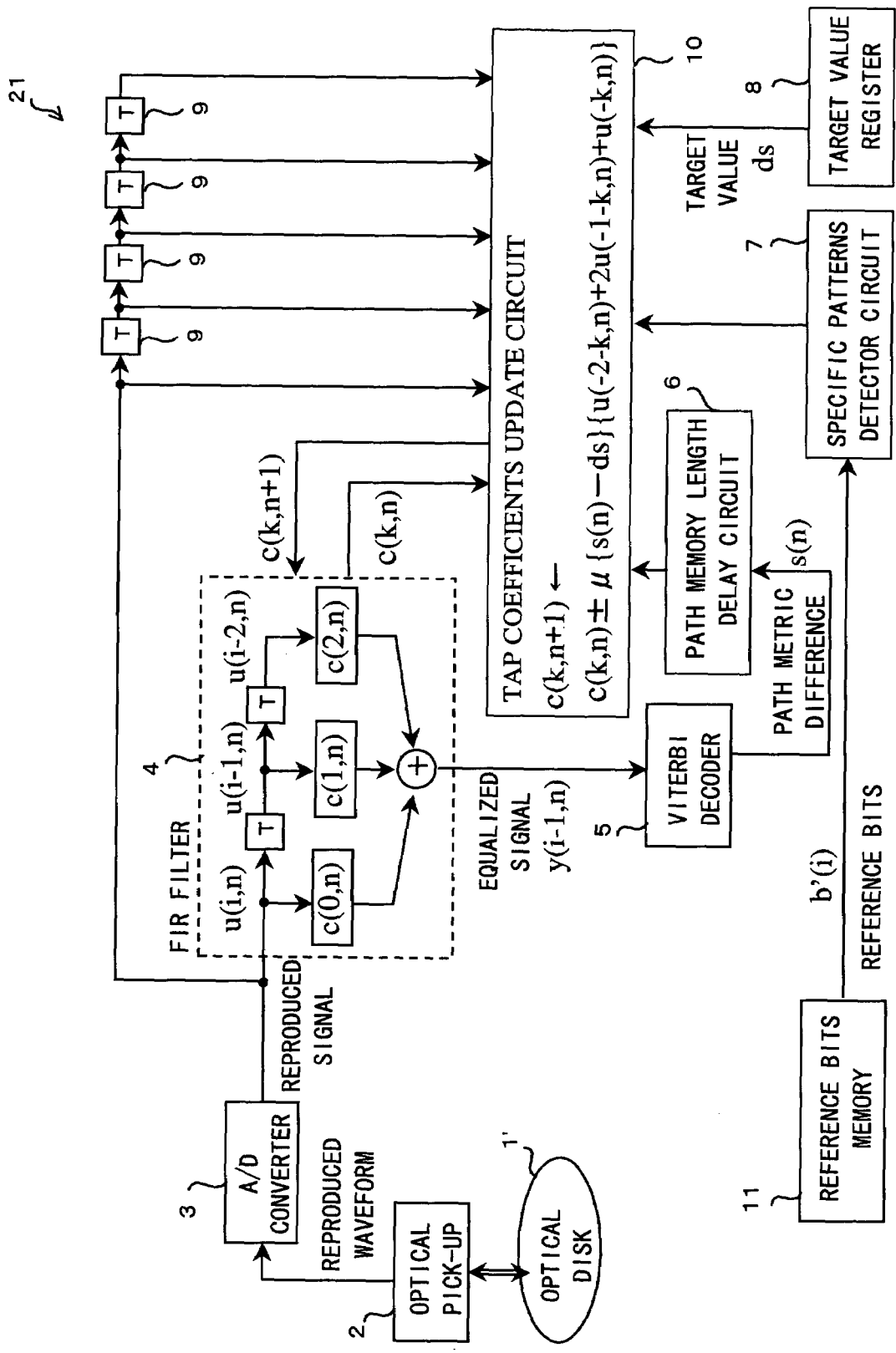
FIG. 11 is a block diagram showing an arrangement of an optical disc reproducing device according to a second embodiment of the present invention.

The following will describe a second embodiment of the present invention with reference to FIG. 11. Here, for convenience, members of the present embodiment that have the same arrangement and function as members of embodiment 1, and that are mentioned in that embodiment are indicated by the same reference numerals and description thereof is omitted.

An optical disc reproducing device 21 of the present embodiment adjusts equalization properties using an optical disc 1' on which a known bit pattern is stored. The known bit pattern is stored as a reference bit pattern in a reference bit pattern memory 11. The optical disc 1' is assumed to have an equalization properties adjusting track in which the known bit pattern is stored.

When the known bit pattern is reproduced from the optical disc 1', the same bit pattern b'(i) as the reproduced known bit pattern is fed to the specific patterns detector circuit 7 from the reference bit pattern memory 11 in synchronism with the reproduced known bit pattern. In other words, the reference bit pattern memory (memory means) 11 holds a predetermined reference bit pattern and when it receives a reference signal pattern which, when decoded, should provide the reference bit pattern as a reproduced signal pattern, outputs the reference bit pattern in synchronism with the reference signal pattern.

Subsequent operation is similar to embodiment 1 where when the specific patterns detector circuit 7 detects one of specific patterns on the basis of bit pattern b'(i), the tap coefficients update circuit 10 updates the tap coefficient of the FIR filter 4. Detailed description is therefore omitted.

The optical disc reproducing device 21 involves no Viterbi decoding delay, hence no associated time difference. In other words, there is no time difference between b'(i) and s(n) and between b'(i) and u(i,n). Therefore, the optical disc reproducing device 21 does not require the path memory length delay circuits 6, where as the optical disc reproducing device 20 of embodiment 1 does.

In this manner, the optical disc reproducing device 21 eliminates the delay in the update of tap coefficients by the tap coefficients update circuit 10 through the use of a known reference bit pattern, thereby achieving highly responsive adaptive equalization.

The arrangement as in embodiment 1 may be employed where for each decoded pattern in a reference bit pattern, the target value register 8 sets a target value ds to an ideal value for the corresponding path metric difference, so as to reduce deviation of the path metric differences for reproduced signals from ideal values and minimize the mean square error $E[\{s(n)-ds\}^2]$.

As in the foregoing, embodiments 1, 2 have described optical disc reproducing devices as examples information reproducing devices. The present invention is not limited to these examples and effectively applicable to every PRML signal reproducing device: for example, magnetic recording/reproducing device, such as hard disks, magnetism tape devices; and communications devices, such as communication data receiving devices.

Figure 12:
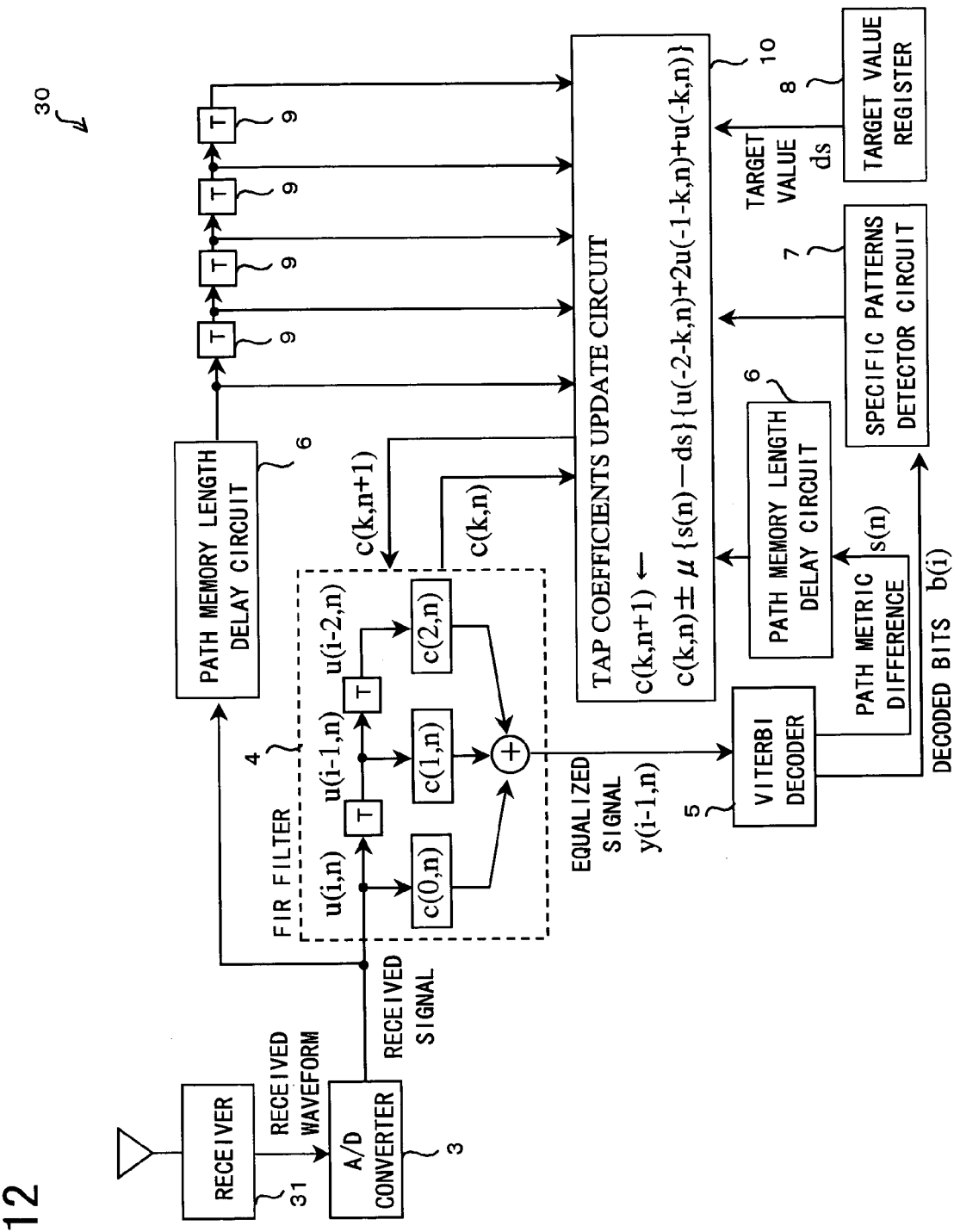
FIG. 12 is a block diagram showing an arrangement of a communication data receiving device according to an embodiment of the present invention.
Figure 13:
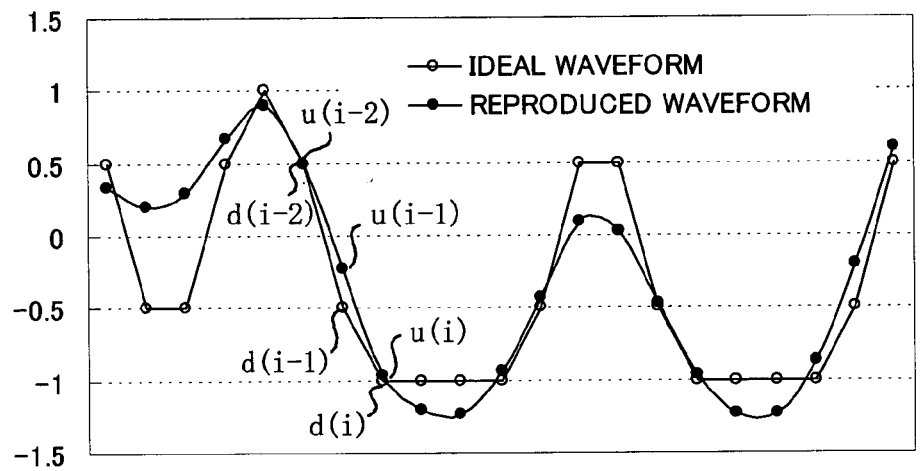
FIG. 13 is a graph showing a relationship between a reproduced waveform and an ideal waveform assumed in accordance with PR (1, 2, 1) properties.

An example is shown in FIG. 12 where the arrangement of a communication data receiving device (communications device) 30, an equivalent to the optical disc reproducing device 20 of embodiment 1. The communication data receiving device 30 here has an arrangement corresponding to embodiment 1; alternatively, it may have an arrangement corresponding to embodiment 2.

The communication data receiving device 30 includes a receiver (receiving means) 31 receiving a communication waveform transmitted through a communication path, wired or wireless (FIG. 12 shows the latter), replacing the optical pickup 2 for the case of the optical disc reproducing device 20. The communication data receiving device 30 is otherwise arranged identically to the optical disc reproducing device 20; detailed description is omitted here.

Each block in the waveform equalizing devices of embodiments 1, 2 may be constructed of either hardware or software. A computer-based software implementation is be presented next.

The waveform equalizing device (the optical disc reproducing device 20, 21 in FIG. 1, 11 less the optical disc 1, the optical pickup 2, and the A/D converter 3 or the communication data receiving device 30 in FIG. 12 less the receiver 31 and the A/D converter 3) may be constructed of a computer including a CPU (central processing unit) executing instructions in a waveform equalization program implementing the functions of the device, a ROM (read only memory) storing the program, a RAM (random access memory) into which the program is loaded, and a memory storing the program and various data and other storage device (storage medium) among others. In other words, the objectives of the present invention is achievable by loading into a computer a computer-readable storage medium storing program codes (an execution program, intermediate code program, or source program) of a waveform equalization program which is a software implementation of the aforementioned functions and causing the computer to read and execute the program codes recorded on the storage medium. In this case, the program codes per se as read out from the storage medium realizes the aforementioned functions, and the storage medium storing the program codes constitutes the present invention.

"Means" in this specification does not necessarily refer to a physical entity, and may be implemented in terms of function by software. Further, a function/functions of individual means may be realized by way of two or more physical entities. Conversely, the function(s) of independent means may be realized by a single physical entity.

As in the foregoing description, a waveform equalizing device of the present invention is a waveform equalizing device adaptively equalizing the waveform of a Viterbi-decodable input signal pattern (reproduced signal pattern). The waveform equalizing device includes: equalization means (FIR filter 4) for generating an equalized signal pattern through equalization of a waveform according to the input signal pattern; path metric difference detection means (Viterbi decoder 5) for detecting a path metric difference between a correct path and an error path in Viterbi decoding based on the equalized signal pattern; target value setting means (target value register 8) for setting a target value for the path metric difference; and equalization adapting means (tap coefficients update circuit 10) for adapting the equalization according to an error of the detected path metric difference from the target value.

Through the adaptation of equalization properties using the path metric difference, the waveform equalizing device of the present invention is capable of having the error rate involved in the adaptation and better lower the decoding error rate. In addition, focusing on the fact that an ideal path metric difference can be determined for each predetermined path and that the actually detected path metric difference has deviation with respect to the ideal path metric difference, the waveform equalizing device of the present invention is arranged first to set a target value for the path metric difference and then to adapt the equalization properties on the basis of the error of the actually detected path metric difference from the target value setting. Thus, necessary computation is greatly facilitated compared to the calculation of, for example, standard deviation of the path metric difference and the adaptation of the equalization properties so that the standard deviation is minimized.

The waveform equalizing device of the present invention may be the one which follows. The waveform equalizing device includes: equalization means for performing waveform equalization on an input signal; path metric difference detection means for obtaining a path metric difference between the two paths merging in Viterbi decoding with respect to an output from the equalization means; and equalization adapting means adapts the equalization properties of the equalization means so as to minimize the mean square error of the path metric differences from the target values.

Besides, the waveform equalizing device may be such that the equalization means is made of an FIR filter convolving an input signal vector with a tap coefficient vector and the equalization adapting means updates the tap coefficient vector of the FIR filter so as to minimize the mean square error of the path metric differences from the target value.

Besides, the present waveform equalizing device is provided with gradient vector computing means for computing a gradient vector which is a differential of the mean square errors according to the tap coefficient vector, wherein the equalization adapting means subtracts the gradient vector multiplied by a scalar to correct the tap coefficient vector.

Besides, the present waveform equalizing device is such that the gradient vector computing means computes the mean of the products of the errors of the path metric differences from the target value and the linear combinations of the input signal vectors and outputs the mean as the gradient vector.

Besides, the present waveform equalizing device is such that the gradient vector computing means computes the products of the errors of the path metric differences from the target value and the linear combinations of the input signal vectors and outputs the products as the gradient vector.

Besides, the present waveform equalizing device is provided with decoding means for decoding the input signal to produce a decoded bit pattern and pattern detection means for detecting in the decoded bit pattern a specific pattern of which the path metric difference with respect to a corresponding ideal waveform is equal to a predetermined value. The equalization adapting means adapts the equalization properties of the equalization means only when the specific pattern is detected.

Besides, the present waveform equalizing device is provided with information data decoding means for Viterbi decoding the input signal into information data bits, wherein the decoding means Viterbi decodes the signal with a shorter path memory length than the information data decoding means to produce decoded bits.

Besides, the present waveform equalizing device is provided with: memory means for receiving the input signal which is a signal from a known reference bit pattern and holding the reference bit pattern; and pattern detection means for detecting in the reference bit pattern a specific pattern of which the path metric difference with respect to a corresponding ideal waveform is equal to a predetermined value, wherein the equalization adapting means adapts the equalization properties of the equalization means only when the specific pattern is detected.

Besides, the present waveform equalizing device is such that the equalization adapting means sets the target value to the predetermined value for the path metric difference.

Besides, the present waveform equalizing device is such that the equalization adapting means sets the predetermined value to a minimum value for the path metric difference calculated with respect to the ideal waveforms corresponding to all possible patterns.

Besides, the present waveform equalizing device is such that the equalization adapting means sets the predetermined value to minimum values for the path metric difference calculated and selected with respect to the ideal waveforms corresponding to all possible patterns.

Besides, the present waveform equalizing device is provided with decoding means for decoding the input signal to produce a decoded bit pattern, wherein the equalization adapting means sets the target value to the path metric difference calculated with respect to ideal waveforms corresponding to the decoded bit patterns at times.

Besides, the present waveform equalizing device is provided with memory means for receiving the input signal which is a reproduced signal for a known reference bit pattern and holding the reference bit pattern, wherein the equalization adapting means sets the target value to the path metric difference calculated with respect to ideal waveforms corresponding to the reference bit pattern at times.

As in the foregoing description, the waveform equalizing device of the present invention is a waveform equalizing device for adaptively equalizing a waveform of a Viterbi-decodable input signal pattern, and arranged to include: equalization means for generating an equalized signal pattern through equalization of a waveform according to the input signal pattern; path metric difference detection means for detecting a path metric difference between a correct path and an error path in Viterbi decoding based on the equalized signal pattern; target value setting means for setting a target value for the path metric difference; and equalization adapting means for adapting the equalization according to an error of the detected path metric difference from the target value.

Besides, the waveform equalization method of the present invention is a waveform equalization method of adaptively equalizing a waveform of a Viterbi-decodable input signal pattern, and includes the steps of:

(a) generating an equalized signal pattern through equalization of a waveform according to the input signal pattern;

(b) detecting a path metric difference between a correct path and an error path in the Viterbi decoding based on the equalized signal pattern; and (c) adapting the equalization according to an error of the detected path metric difference from a target value for the path metric difference.

According to the arrangement and method, a path metric difference is detected according to an equalized signal pattern, and equalization properties are adapted using the path metric difference.

As mentioned earlier, adaptive equalization based on conventional LMS attempts to adapt equalization properties for a signal at a time on the basis of an input signal and an ideal waveform signal, without considering the error rate of the decoded signal; the equalization properties is not always adapted so that the error rate is optimal.

In contrast, using the path metric difference, the error rate is taken into consideration in the adaptation of the equalization properties for the following reasons. The path metric difference is an indicator for determining a correct path from two paths, one of which will be the survivor, in Viterbi decoding. The path metric difference therefore indicates what risk the equalized signal pattern from which the path metric difference is detected has of determining a wrong path as the survivor path in decoding, i.e., how likely an error will occur in decoding. Using such a path metric difference, the adaptation of equalization properties can involve the error rate, and the decoding error rate can be decreased better.

Here, to reduce the error rate, it would be sufficient if the deviation of the path metric difference detected correspondingly to a predetermined path are reduced. However, calculating for example the standard deviation of the path metric difference and adapting the equalization properties for a minimum standard deviation, so as to reduce the deviation of the path metric difference, requires complex computation and makes the method too difficult for practical implementation.

Accordingly, in the present invention, we focus on the fact that an ideal path metric difference is determined for a predetermined path and that the path metric difference actually detected has a deviation with respect to the ideal path metric difference. As in the arrangement and method, the present invention sets a target value for the path metric difference and then adapts equalization properties on the basis of an error between the actually detected path metric difference and the target value setting. Thus, necessary computation is greatly facilitated compared to the calculation of, for example, standard deviation of the path metric difference and the adaptation of the equalization properties so that the standard deviation is minimized.

As a result, the arrangement and method a waveform equalizing device and method which is capable of better lowering the decoding error rate.

The waveform equalizing device of the present invention, in the foregoing waveform equalizing device, is preferably such that the path metric difference detection means sequentially detects path metric differences between associated correct paths and error paths as the Viterbi decoding proceeds; and the equalization adapting means adapts the equalization so as to minimize a mean square of errors of the detected path metric differences.

Besides, the waveform equalization method of the present invention, in the foregoing waveform equalization method, is preferably such that step (b) is recursively carried out so as to sequentially detect path metric differences between associated correct paths and error paths as the Viterbi decoding proceeds; and step (c) adapts the equalization so as to minimize a mean square of errors of the detected path metric differences.

According to the arrangement and the method, to reduce the error rate, it would be sufficient if the equalization is adapted so as to reduce the mean square of the errors. Such adaptation can be done without necessarily calculate the actual mean square error, but by repeating the adaptation so as to reduce the mean square error as a result.

The waveform equalizing device of the present invention, in the foregoing waveform equalizing device, is preferably such that: the equalization means sequentially associates input signals forming the input signal pattern with equalization coefficients and convolves the equalization coefficients with the input signals associated with the equalization coefficients, so as to generate the equalized signal pattern; and the equalization adapting means updates the equalization coefficients so as to minimize a square of the error which is a function of the equalization coefficients, in order to adapt the equalization.

Besides, the waveform equalization method of the present invention, in the foregoing waveform equalization method, is preferably such that step (a) sequentially associates input signals forming the input signal pattern with equalization coefficients and convolves the equalization coefficients with the input signals associated with the equalization coefficients, so as to generate the equalized signal pattern; and step (c) updates the equalization coefficients so as to minimize a square of the error which is a function of the equalization coefficients, in order to adapt the equalization.

According to the arrangement and the method, the equalization is adapted through an update of the equalization coefficient of the equalization means. To implement the update of the equalization coefficient, a function of the equalization coefficient is assumed which expresses the square of the error. The error is the one of the path metric difference detected on the basis of the equalized signal pattern, and the equalized signal pattern is the convolution of the input signals with the equalization coefficient; therefore, the square value of the error can be expressed as a function of a variable equalization coefficient.

By recursively adapting by means of the updates of the equalization coefficients in such a direction that the function is minimized, the mean square error, or the mean square of the errors which correspond to the path metric differences sequentially detected as the Viterbi decoding progresses, can be minimized. As a result, the decoding error rate can be better lowered.

To update the equalization coefficients in such a direction that the function is minimized, it would be sufficient if the equalization adapting means subtracts a gradient multiplied by a constant value from the equalization coefficients, so as to update the equalization coefficients, the gradient being a partial differentiation of the function with respect to the equalization coefficient.

The waveform equalizing device of the present invention, in the foregoing waveform equalizing device, is preferably such that the equalization adapting means is arranged to calculate a product of the error and a sum of the input signals with predetermined weights to obtain the gradient, the input signals forming the input signal pattern giving a path corresponding to the path metric difference where the error occurs.

According to the arrangement, the gradient can be calculated as the product of the error and a sum of the input signals with predetermined weights. The weights can be determined according to the particular one of the equalization coefficients which is to be updated and also to the partial response properties assumed for the path metric difference detection means. The equalization adapting means is arranged to carry out the calculation and therefore able to calculate the gradient through a combination of additions, multiplications, and simple calculations so as to update the equalization coefficient.

As a result, according to the arrangement, the equalization adapting means can be constructed of a simpler circuit arrangement.

The waveform equalizing device of the present invention, in the foregoing waveform equalizing device, preferably further includes: decoding means for decoding the input signal pattern to generate a decoded bit pattern; and pattern detection means for detecting, in the decoded bit pattern, one of such specific bit patterns that when an ideal waveform signal pattern for the Viterbi decoding is assumed, the path metric difference becomes equal to a pre-specified value, wherein when one of the specific patterns is detected, the equalization adapting means adapts the equalization according to an error of a path metric difference, from a target value, detected according to a signal pattern corresponding to the detected one of the specific patterns in the equalized signal pattern.

According to the arrangement, the adaptation is based on a specific pattern such that the path metric difference according to an ideal waveform signal pattern has a specified value. Equalization properties can be optimized only on a pattern which will likely cause an error in Viterbi decoding.

The waveform equalizing device of the present invention, in the foregoing waveform equalizing device, preferably further includes information data decoding means for Viterbi decoding the equalized signal pattern to generate an information data bit pattern used as information data, wherein the decoding means performs Viterbi decoding with a shorter path memory length than that in the Viterbi decoding by the information data decoding means, so as to generate the decoded bit pattern.

The decoding for information data bit pattern used as information data needs to have a sufficiently small error rate; the path memory length in Viterbi decoding needs to be sufficiently long. Since information data bit pattern is output after a time delay corresponding to the path memory length, the detection of a specific pattern on the basis of the information data bit pattern is delayed, causing slow adaptation.

Meanwhile, the decoded bit pattern for use in pattern detection may have a higher error rate than as required with an information data bit pattern, and is still suitable for adaptation.

According to the arrangement, the path memory length of the decoding means generating a decoded bit pattern for use in pattern detection is made shorter than the path memory length of the information data decoding means generating a information data bit pattern. This reduces the delay in pattern detection. As a result, the adaptation delay is reduced to achieve highly responsive adaptation.

The waveform equalizing device of the present invention, in the foregoing waveform equalizing device, preferably further includes: memory means for storing a predetermined reference bit pattern and for, when the memory means receives as the input signal pattern a reference signal pattern which, when decoded, should provide the reference bit pattern, outputting the reference bit pattern in synchronism with the received reference signal pattern; and pattern detection means for detecting, in the reference bit pattern fed from the memory means, one of such specific bit patterns that when ideal waveform signal pattern for the Viterbi decoding is assumed, the path metric difference becomes equal to a pre-specified value, wherein when one of the specific patterns is detected, the equalization adapting means adapts the equalization according to an error of a path metric difference, from a target value, detected according to a signal pattern corresponding to the detected one of the specific patterns in the reference signal pattern.

According to the arrangement, a predetermined reference bit pattern is stored. When a reference signal pattern which, when decoded provides a that reference bit pattern input as an input signal pattern, pattern detection can be carried out on the basis of the reference bit pattern output from the memory means. Therefore, unlike the case of pattern detection based on the decoded bit pattern from the decoding means, the pattern detection delay can be eliminated so that more responsive adaptation can be achieved.

The waveform equalizing device of the present invention, in the foregoing waveform equalizing device, is preferably such that the target value setting means sets the target value to the specified value.

According to the arrangement, the target value is set to a value assuming the path metric difference with respect to the detected path metric difference is detected on the basis of an ideal waveform signal pattern. This optimizes equalization properties.

The waveform equalizing device of the present invention, in the foregoing waveform equalizing device, is preferably such that the specified value is a minimum value of the path metric difference according to the ideal waveform signal pattern.

In Viterbi decoding, an error is most likely to occur in a pattern corresponding to a minimum value of the path metric difference on the basis of the ideal waveform signal pattern. According to the arrangement, the pattern is specified to a specific pattern, which optimizes equalization properties.

The specified value may be a number of minimum values of the path metric difference according to the ideal waveform signal pattern.

The waveform equalizing device of the present invention, in the foregoing waveform equalizing device, preferably further includes: decoding means for decoding the input signal pattern to generate a decoded bit pattern, wherein when the decoding means generates the decoded bit pattern corresponding to the correct path surviving in the Viterbi decoding, the target value setting means sets the target value for the path metric difference detected according to the signal pattern corresponding to the decoded pattern in the equalized signal pattern, to the path metric difference according to the ideal waveform signal pattern in a case when an ideal waveform signal pattern for the Viterbi decoding corresponding to the decoded pattern is assumed.

Alternatively, the waveform equalizing device of the present invention, in the foregoing waveform equalizing device, preferably further includes: memory means for storing a predetermined reference bit pattern and for, when the memory means receives as the input signal pattern a reference signal pattern which, when decoded, should provide the reference bit pattern, outputting the reference bit pattern in synchronism with the received reference signal pattern, wherein when the memory means outputs the reference bit pattern, the target value setting means sets the target value for the path metric difference detected according to the signal pattern which, when decoded, should provide the reference bit pattern in the equalized signal pattern, to the path metric difference according to the ideal waveform signal pattern in a case when an ideal waveform signal pattern for the Viterbi decoding corresponding to the decoded pattern is assumed.

As in the arrangement, the adaptation may be based on various decoded patterns by setting the target value to a different value for every generated decoded pattern.

The information reproducing device of the present invention is arranged to include any one of the foregoing waveform equalizing devices and reproduction means for reproducing the input signal pattern from an information storage medium.

Besides, the communications device of the present invention is arranged to include any one of the waveform equalizing devices and receiving means for receiving the input signal pattern transmitted over a communication path.

In this manner, the information reproducing device and communications device including the waveform equalizing device of the present invention can better lower the decoding error rate owing to the advantages of the waveform equalizing device of the present invention.

The waveform equalization program of the present invention is a waveform equalization program of operating any one of the waveform equalizing devices, and causes a computer to function as each of the means.

According to the arrangement, the computer realizes each means for the waveform equalizing device to realize the waveform equalizing device. Therefore, as the aforementioned waveform equalizing device, the decoding error rate can be better lowered.

Besides, the computer-readable storage medium on which is recorded the waveform equalization program of the present invention stores a program causing a computer to function as each of the means.

According to the arrangement, the waveform equalizing device can be realized through the use of a computer by the waveform equalization program read from the storage medium.

Embodiment 3

The following description will describe a third embodiment of the present invention referring to FIGS. 15 to 20.

The signal quality evaluation device (circuit) of the present invention evaluates quality of a digital reproduced signal, that has not been subjected to the signal process for Viterbi decoding, according to the path metric difference.

Thus, the signal quality evaluation device is applicable to a device which performs Viterbi-decoding signal reproduction, or a device which does not actually perform the signal reproduction but is based on the Viterbi-decoding reproduction. That is, the signal quality evaluation device can be preferably installed to an optical disc reproducing device, a magnetic recording/reproducing device such as a hard disk device and a magnetic tape device, and a communication data receiving device. For example, if the signal quality evaluation device is installed to the optical disc reproducing device in combination with a controlling function, it is possible to adjust offset of a servo or an optical system, and to adjust power of a light beam. Further, if the signal quality evaluation device is solely installed, it is possible to perform the foregoing adjustment, and to check the quality of the optical disc.

The present embodiment describes the following optical disc reproducing device as an example. The optical disc reproducing device includes the signal quality evaluation device, and optimally controls the power of the light beam, emitted onto a magnetic super resolution magneto-optical disc (hereinafter, referred to as "optical disc"), on the basis of a result of evaluation obtained by making the signal quality evaluation device evaluate a digital reproduced signal reproduced from the optical disc.

Figure 15:
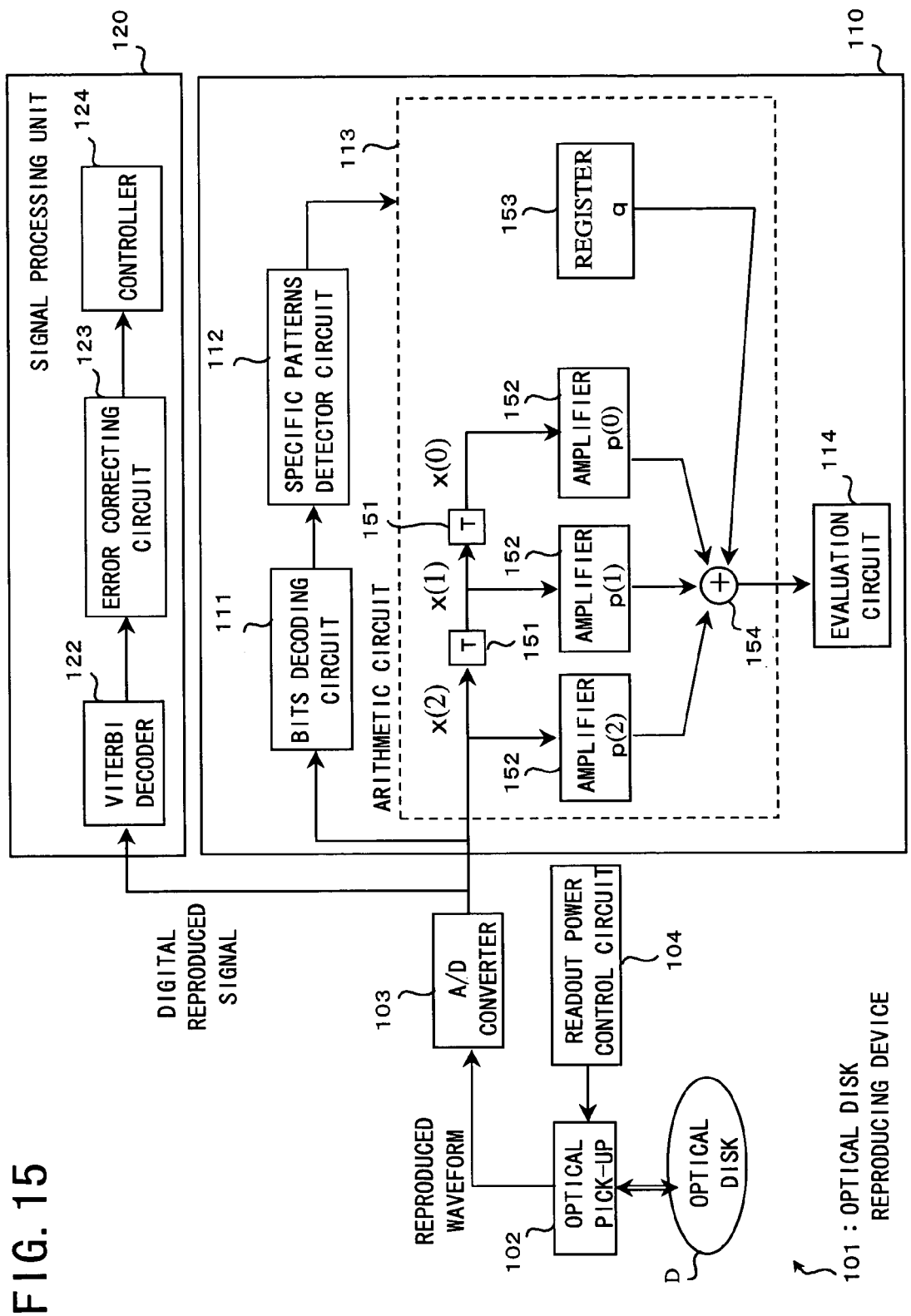
FIG. 15 is a block diagram schematically showing an arrangement of an optical disc reproducing device according to a third embodiment of the present invention.

As shown in FIG. 15, the optical disc reproducing device (reproducing device) 101 according to the present embodiment includes at least an optical pickup 102, an A/D converter 103, a readout power control circuit (control means) 104, a signal quality evaluation section (signal quality evaluation device) 110, and a signal reproduction section 120.

In the optical disc reproducing device 101, an analog reproduced signal detected by the optical pickup 102 emitting a laser beam to recorded marks on an optical disk D is subjected to A/D conversion by the A/D converter 103, so that a digital reproduced signal (digital signal) is output. The signal reproduction section 120 performs the PRML signal process for Viterbi decoding with respect to the digital reproduced signal output by the A/D converter 103, so as to reproduce and output information stored on the optical disc D.

Further, in the optical disc reproducing device 101, the signal quality evaluation device 110 evaluates the quality of the digital reproduced signal output by the A/D converter 103 on the basis of the path metric difference, and the readout power control circuit 104 optimally controls the power of the light beam, emitted onto the optical disc D, on the basis of a result of evaluation by the signal quality evaluation section 110.

Thus, the optical disc reproducing device 101 can evaluate the quality of the Viterbi-decodable digital signal by means of the signal quality evaluation section 110 without using a Viterbi decoding circuit. Further, the optical disc reproducing device 101 can control the quality of the digital reproduced signal in accordance with the result of evaluation of the digital reproduced signal that has been output by the signal quality evaluation section 110.

The respective blocks shown in FIG. 15 are detailed as follows.

The optical pickup 102 is made of a semiconductor laser, various optical components, a photodiode, and other parts (not shown), wherein a laser beam emitted from the semiconductor laser reflects off a recorded mark recorded on the optical disc D, and the reflection is transduced to an electricity signal by the photodiode, and an analog reproduced waveform is output. An amplitude of the analog reproduced waveform is adjusted so as to be within an input range of the A/D converter 103 at the next stage, and is then output.

The A/D converter 103 performs the A/D conversion with respect to the reproduced waveform output from the optical pickup 102 (hereinafter, sometimes referred to as "analog reproduced signal") at a timing of a channel frequency clock, so as to output the digital reproduced signal. The digital reproduced signal is input not only to the signal reproduction section 120 but also to the signal quality evaluation section 110. Note that a waveform equalizer may be provided right after the A/D converter 103 so that the digital reproduced signal quantized by the A/D converter 103 and then equalized by the waveform equalizer is fed to the signal reproduction section 120 and the signal quality evaluation section 110. Alternatively, in a case where not only the waveform equalizer but also the Viterbi decoder 122 is provided in a PRML circuit, that is, in a case of using a signal processing LSI which performs PRML waveform equalization and Viterbi decoding in the signal reproduction section 120, a waveform equalizer having the same properties may be provided to the input of the signal quality evaluation section 110 so that the digital reproduced signal from the A/D converter 103, is equalized by the waveform equalizer before being fed to a bits decoding circuit 111 and an arithmetic circuit 113.

Here, let us suppose PR (1, 2, 1) partial response properties (PR properties). Further, adjustment is made so that an envelope of the analog reproduced waveform ranges from 0 to 4 (amplitude ±2, central level 2). Thus, ideal waveform levels assumed in PR (1, 2, 1) are 5 levels: 0, 1, 2, 3, and 4. Note that the optical disc D has a recorded mark pattern recorded thereon based on d=1 RLL (Run Length Limited) coding, such as (1,7) RLL coding, that is, modulation with the shortest mark length of 2T.

The signal reproduction section 120 includes a Viterbi decoder (Viterbi decoding means) 122, an error correcting circuit 123, and a controller 124.

The Viterbi decoder 122 Viterbi decodes the equalized signal by PRML. The error correcting circuit 123 performs the error correction on the decoded signal, and then outputs the signal to the controller 124.

The readout power control circuit 104 receives a result of evaluation of the digital reproduced signal from the evaluation circuit 114 in the signal quality evaluation section 110, and controls a semiconductor laser driving current of the optical pickup 102 on the basis of the result of the evaluation. Specifically, for example, the signal quality is evaluated while varying the driving current little by little, and the driving current is regarded as being most optimal when the signal quality is evaluated as being the most satisfactory.

Thus, it is possible to control the reproduction power so as to optimize the current reproduction power (to control reproduction power of the laser beam so that it is possible to obtain the sufficient reproduced signal for reproducing the data and a size of a detection window is kept so small that interference (noise) is minimized). Note that the detection window is the part, of the magnetic super resolution optical disk D, which is irradiated with a laser beam up to or exceeding a predetermined temperature.

The signal quality evaluation section 110 includes a bits decoding circuit (bit pattern generating means) 111, a specific patterns detector circuit (specific patterns detection means) 112, an arithmetic circuit (computing means) 113, and an evaluation circuit (evaluation means) 114.

The bits decoding circuit 111 decodes the digital reproduced signal output from the A/D converter 103 into an original bit pattern. Here, the bits decoding circuit 111 can be realized by a binary detector circuit which binarizes the digital reproduced signal by comparing with a threshold value for example. That is, the bits decoding circuit 111 is arranged in an extremely simple manner compared to the Viterbi decoder 122.

A reason for which the bit decoding for detecting a specific pattern is based not on PRML but on the binary detection is as follows. The bit pattern decoded by the binary detection is less favorable than the bit pattern decoded by PRML in terms of an error rate (the decoded bit pattern is often mismatched with the correct bit pattern). However, a bit error rate in a case where an ordinary evaluation target is subjected to the binary detection is such that several error bits can occur in every 100 to 1000 bits, and the calculated SAM is statistically processed as a histogram, so that the decoding errors have little influence on the signal quality evaluation value obtained as the evaluation result.

The specific patterns detector circuit 112 determines whether or not the bit pattern decoded by the bits decoding circuit 111 matches any one of specific patterns "00111", "00011", "11000", and "11100".

Figure 16:
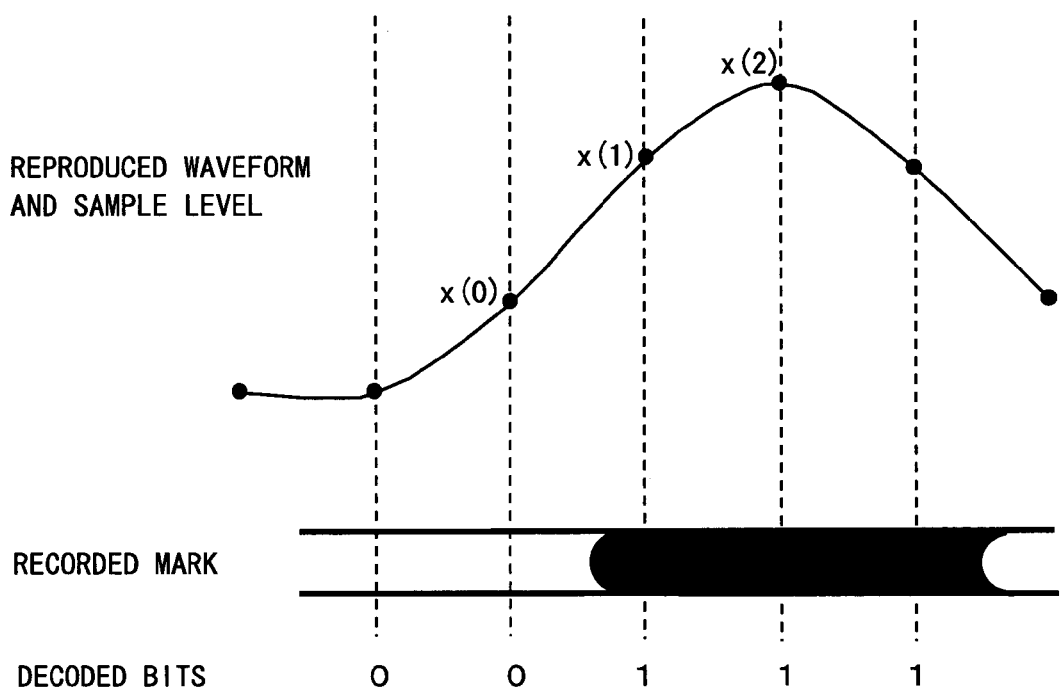
FIG. 16 is a schematic showing a relationship between a specific pattern and a digital reproduced signal pattern in a signal quality evaluation section of the optical disc reproducing device shown in FIG. 15.

The arithmetic circuit 113 is made up of two T-delay elements 151, three gain variable amplifiers 152 (gains are $p(0)$, $p(1)$, and $p(2)$ respectively), a register 153 for storing a constant value q, and an adder 154. Further, the arithmetic circuit 113 evaluates $p(0)x(0)+p(1)x(1)+p(2)x(2)+q$ in accordance with a digital reproduced signal pattern $x(0)$, $x(1)$, $x(2)$, that is received from the A/D converter 103, and then outputs the result of the calculation. As shown in FIG. 16, the digital reproduced signal pattern $x(0)$, $x(1)$, $x(2)$, used in calculation by the arithmetic circuit 113, corresponds to three middle bits of the five successive bits detected by the specific patterns detector circuit 112.

Here, $p(0)$, $p(1)$, $p(2)$, q are set so as to correspond to a result of the detection by the specific patterns detector circuit 112. That is, when the pattern "00111" or "11100" is detected, $p(0)=p(2)=2$, $p(1)=4$, $q=-16$. When the pattern "00011" or "11000" is detected, $p(0)=p(2)=-2$, $p(1)=-4$, $q=16$.

In this manner, when the specific patterns detector circuit 112 detects one of the specific patterns, the arithmetic circuit 113 calculates the path metric difference between a correct path dictated by the detected one of specific patterns and an error path which fails to survive the correct path in Viterbi decoding, by using equations each predetermined for a different one of the specific patterns, on the basis of the digital reproduced signal. Further, in the arithmetic circuit 113, each of the equations given to the path metric difference is predetermined for a different one of the specific patterns in accordance with the partial response properties in Viterbi decoding, and is switchable in accordance with the specific patterns detected by the specific patterns detector circuit 112.

The evaluation circuit 114 calculates a standard deviation of an output value of a result of computation, so as to evaluate the quality of the digital reproduced signal. Specifically, the digital reproduced signal with a smaller standard deviation is regarded as being better. Note that how to use the result of computation by the arithmetic circuit 113 can be determined according to specifications of devices (systems) such as the signal quality evaluation section 110 or the optical disc reproducing device 101 having the signal quality evaluation section 110.

Next, operations for evaluating the quality of the digital reproduced signal and operations for controlling the reproduction power are described as follows.

First, a light beam is emitted from the optical pickup 102 onto the optical disc D, so as to output an analog reproduced waveform adjusted so that a central level is 2 and an amplitude is ±2. The analog reproduced waveform is converted into a digital reproduced signal pattern $x(i)$ ($i= \ldots$, $-1$, $0$, $1$, $\ldots$ ) by the A/D converter 103.

The digital reproduced signal pattern $x(i)$ is input to the bits decoding circuit 111, so that the pattern $x(i)$ is decoded into the bit pattern. Further, the specific patterns detector circuit 112 determines whether or not a decoded bit pattern of five successive bits matches one of specific bit patterns "00111", "00011", "11000", and "11100".

Meanwhile, the digital reproduced signal $x(i)$ is input also to the arithmetic circuit 113. The arithmetic circuit 113 calculates $p(0)x(0)+p(1)x(1)+p(2)x(2)+q$, only when the specific patterns detector circuit 112 detects any one of the aforementioned four patterns As described above, $p(0)$, $p(1)$, $p(2)$, q are determined in accordance with a result of detection by the specific patterns detector circuit 112.

For example, suppose that the specific patterns detector circuit 112 detects a pattern "11100" and the digital reproduced signal pattern at this time is $x(0)=4.2$, $x(1)=2.9$, $x(2)=0.8$, the arithmetic circuit 113 calculates $2\times4.2+4\times2.9+2\times0.8-16=5.6$.

Further, the evaluation circuit 114 calculates a standard deviation of the computed value input every time the four patterns are detected. The digital reproduced signal with a smaller standard deviation is regarded as being better. Lastly, the readout power control circuit 104 controls power of the light beam emitted onto the optical disc in accordance with an output of the evaluation circuit 114, thereby making the digital reproduced signal suitable for the Viterbi decoder 122 to decode.

A reason for which the quality of the digital reproduced signal can be evaluated by means of the signal quality evaluation section 110 is detailed as follows.

As described above, the SAM histogram is a distribution whose shape is largely different from normal distribution. The SAM histogram is generated by selecting only such a pattern that SAM is highly likely to be less than 0 (i.e., a bit error is highly likely to occur) because of noise and the SAM ideal value=6, so that it is possible to evaluate the quality of the reproduced signal. As the pattern in which the SAM ideal value=6, there are four patterns "00111", "11000", "00011", and "11100" each of which indicates a minimum number of state transitions occurring before the error path merges with the correct path.

Figure 17:
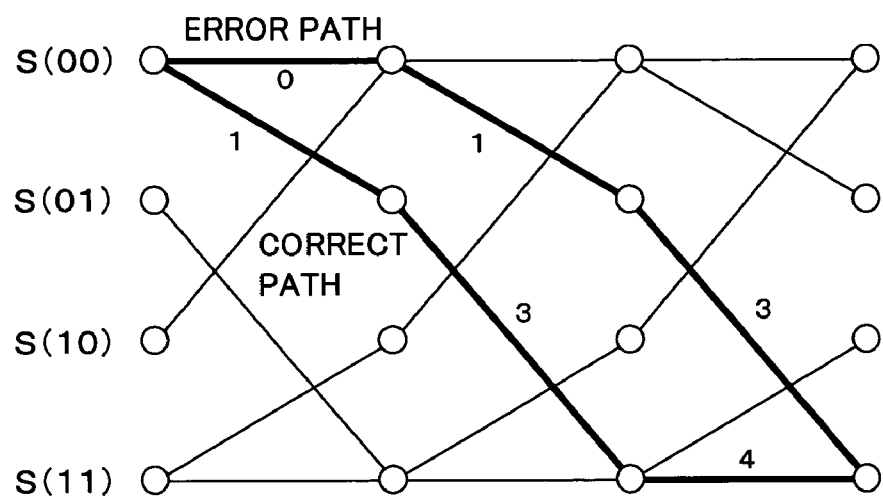
FIG. 17 is a schematic showing trellis lines of PR (1, 2, 1) properties corresponding to a pattern "00111".

FIG. 17 shows a trellis diagram corresponding to the pattern "00111", and shows that: with respect to the correct path "S(00)-S(01)-S(11)-S(11)", the error path which brings about the minimum number of state transitions before merging with the last state S(11) is "S(00)-S(00)-S(01)-S(11)". That is, it is possible to specify the correct path and the error path corresponding to the correct path on the basis of the specific patterns. At this time, ideal waveform values of the correct path are 1, 3, 4 in order, and ideal waveform values of the error path are 0, 1, 3 in order. Since SAM (path metric difference) is calculated by subtracting a path metric of the correct path from a path metric of the error path, SAM can be calculated from the corresponding digital reproduced signal patterns $x(0)$, $x(1)$, $x(2)$ as shown in the following equation.

$$SAM = [\{x(0) - 0\}^2 + \{x(1) - 1\}^2 + \{x(2) - 3\}^2] - \qquad (24)$$
$$[\{x(0) - 1\}^2 + \{x(1) - 3\}^2 + \{x(2) - 4\}^2]$$
$$= 2x(0) + 4x(1) + 2x(2) - 16$$

Likewise, it is possible to perform calculation as to other patterns. After all, in the case of the patterns "00111" and "11100", SAM=2x(0)+4x(1)+2x(2)−16. In the case of the pattern "00011" or "11000", SAM=−2x(0)−4x(1)−2x(2)+16.

Figure 18:
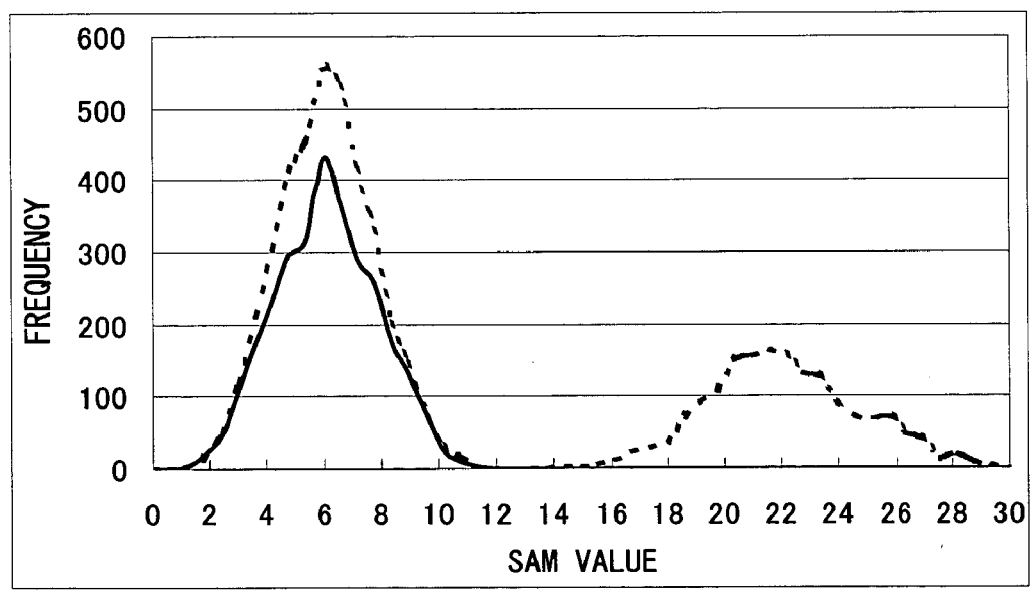
FIG. 18 is a SAM histogram calculated from a signal actually reproduced by the optical reproducing device shown in FIG. 15.

FIG. 18 is a graph (continuous line) which shows a histogram made by calculating an output of the arithmetic circuit 13 from an actual optical disc reproduced signal. For the purpose of comparison, the figure shows also a SAM histogram (broken line) made by performing calculation, concerning all the patterns, which was performed in accordance with a definition of SAM. This graph shows that SAM corresponding to the pattern of the SAM ideal value=6 is calculated on the basis of computation of the arithmetic circuit 113. Further, since it is possible to approximate a shape of the histogram to a normal distribution, it is possible to evaluate a result of computation by the arithmetic circuit 113 on the basis of a normal deviation showing spread of the distribution.

The following specifically describes how to determine gains p(0), . . . , p(n) of the amplifiers 152 . . . of the arithmetic circuit 113 and a constant value q of the register 153, in terms of each partial response property (impulse response property). Note that although the following describes PR (a, b, a), PR (a, a), and PR (a, b, b, a), it is possible to determine the foregoing values as in other partial response properties.

(1) In a case where impulse response of an isolated mark that is assumed in PRML is (a, b, a) and a center value of an ideal waveform is c.

Ideal waveform values of the correct path that are assumed in PRML with respect to the pattern "00111" are −b/2+c, b/2+c, a+b/2+c in order, and ideal waveform values of the error path that are assumed in PRML with respect to the pattern "00111" are −a−b/2+c, −b/2+c, b/2+c in order. Thus, on the basis of the corresponding digital reproduced signal patterns x(0), x(1), x(2), calculation is performed as follows.

$$SAM = [\{x(0) + a + b/2 - c\}^2 + \{x(1) + b/2 - c\}^2 + \qquad (25)$$
$$\{x(2) - b/2 - c\}^2] - [\{x(0) + b/2 - c\}^2 +$$
$$\{x(1) - b/2 - c\}^2 + \{x(2) - a - b/2 - c\}^2]$$
$$= 2\{ax(0) + bx(1) + ax(2)\} - 2c(2a + b)$$

That is, three amplifiers 152 . . . are required in the arithmetic circuit 113, and the calculation results in p(0)=p(2)=2a, p(1)=2b, q=−2c(2a+b). Further, it is possible to perform the same calculation as to other patterns.

After all, in the case where the impulse response of the isolated mark that is assumed in PRML is (a, b, a) and the center value of the ideal waveform is c, (When the specific pattern is "00111" or "11100")

SAM=2 {ax(0)+bx(1)+ax(2)}−2c(2a+b) ∴p(0)=p(2)
  =2a, p(1)=2b, q=−2c(2a+b)

(When the specific pattern is "00011" or "11000")

SAM=−2 {ax(0)+bx(1)+ax(2)}+2c(2a+b) ∴p(0)=p(2)  (26)
  =−2a, p(1)=−2b, q=2c(2a+b)

Thus, in the arithmetic circuit 113, the gains p(0), p(1), p(2) of the amplifiers 152 . . . and the value q of the register 153 are determined as expressed in the equation (26).

(2) In a case where impulse response of an isolated mark that is assumed in PRML is (a, a) and a center value of an ideal waveform is c.

Here, we will suppose a case where a modulation method of the reproduced signal does not involve any d limitation (the modulation method is not Run Length Limited Coding). In case of PRML having a waveform interference width of 2T such as PR (a, a), the trellis diagram shows two states: S(0) and S(1), and there are eight patterns "000", "001", "010", "011", "100", "101", "110", and "111" each of which indicates a minimum number of state transitions occurring before the error path merges with the correct path.

Figure 19:
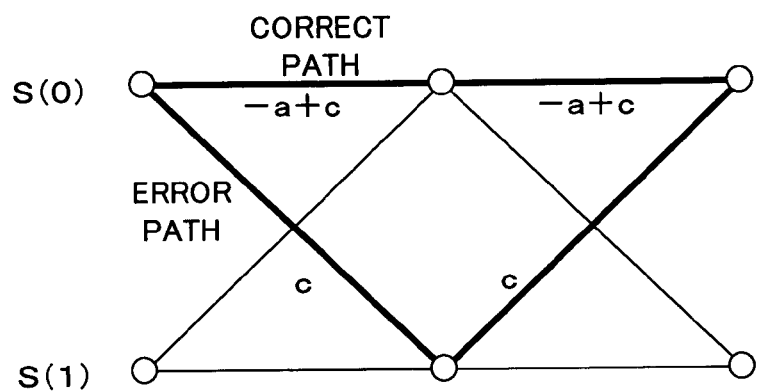
FIG. 19 is a schematic showing trellis lines of PR (a, a) properties corresponding to a correct path "000".

For example, as shown in FIG. 19, the correct path corresponding to the pattern "000" is "S(0)-S(0)-S(0)", and the error path corresponding to the pattern "000" is "S(0)-S(1)-S(0)". Ideal waveform values of the correct path are −a+c and −a+c in order, and ideal waveform values of the error path are c and c in order. Thus, as in the foregoing calculation, it is possible to perform the calculation as follows on the basis of the corresponding digital reproduced signal patterns x(0), x(1).

$$SAM = [\{x(0) - c\}^2 + \{x(1) - c\}^2] - \qquad (27)$$
$$[\{x(0) + a - c\}^2 + \{x(1) + a - c\}^2]$$
$$= -2\{ax(0) + ax(1)\} - 2a^2 + 4ac$$

That is, two amplifiers 152 . . . are required in the arithmetic circuit 113, and the calculation results in p(0)=p(1)=−2a, q=−2a²+4ac. Further, it is possible to perform the same calculation as to other patterns.

After all, in the case where the impulse response of the isolated mark that is assumed in PRML is (a, a) and the center value of the ideal waveform is c, p(0)=p(1) in any pattern, and (When the specific pattern is "000")

p(0)=p(1)=−2a, q=−2a²+4ac (When the specific pattern is "001" or "100")

p(0)=p(1)=−2a, q=4ac (When the specific pattern is "010")

p(0)=p(1)=2a, q=2a²−4ac (When the specific pattern is "011" or "110")

p(0)=p(1)=2a, q=4ac (When the specific pattern is "101")

p(0)=p(1)=−2a, q=2a²+4ac (When the specific pattern is "111")

p(0)=p(1)=2a, q=−2a²−4ac  (28).

Thus, in the arithmetic circuit 133, the gains p(0), p(1) of the two amplifiers 152 and the value q of the register 153 are determined as expressed in the foregoing equations (28).

(3) In a case where the impulse response of the isolated mark that is assumed in PRML is (a, b, b, a) and the center value of the ideal waveform is c.

Here, we will suppose a case where the modulation method of the reproduced signal is d=1 Run Length Limited Coding. In case of PRML having a waveform interference width of 4t such as PR (a, b, b, a), the trellis diagram shows six states: S(000), S(001), S(011), S(100), S(110), and S(111) (Note that S(010) and S(101) are not present due to d=1 limitation), and there are sixteen patterns "0000110", "0110000", ",0000111", "0110001", "1000110", "1110000", "0001110", "0111000", "0001111", "011101", "1001110", "1111000", "1000111", "1110001", "1001111", and "1111001", each of which indicates a minimum number of state transitions before the error path merges with the correct path.

Figure 20:
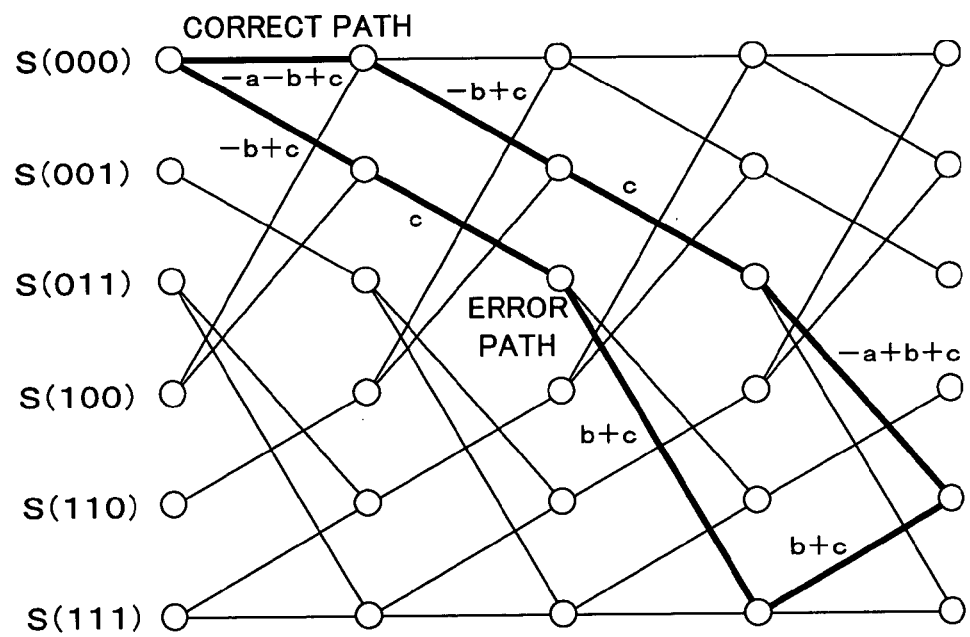
FIG. 20 is a schematic showing trellis lines of PR (a, b, b, a) properties corresponding to a correct path "0000110".
Figure 21:
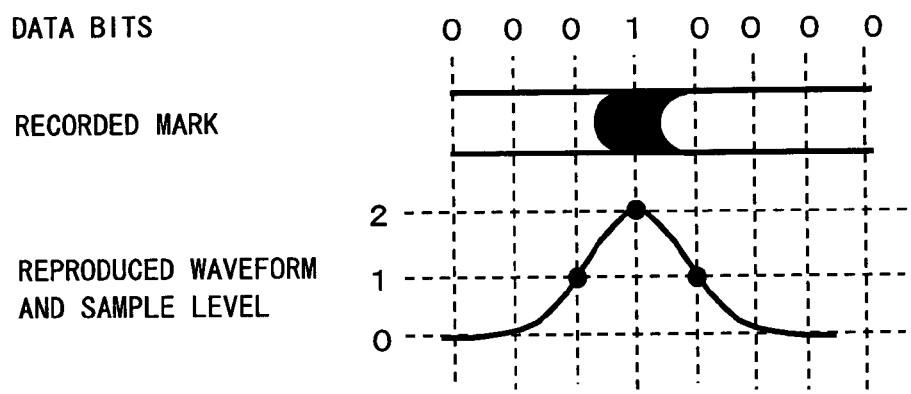
FIG. 21 is a schematic showing a relationship between a reproduced signal waveform and an ideal waveform assumed in accordance with PR (1, 2, 1) properties.
Figure 22:
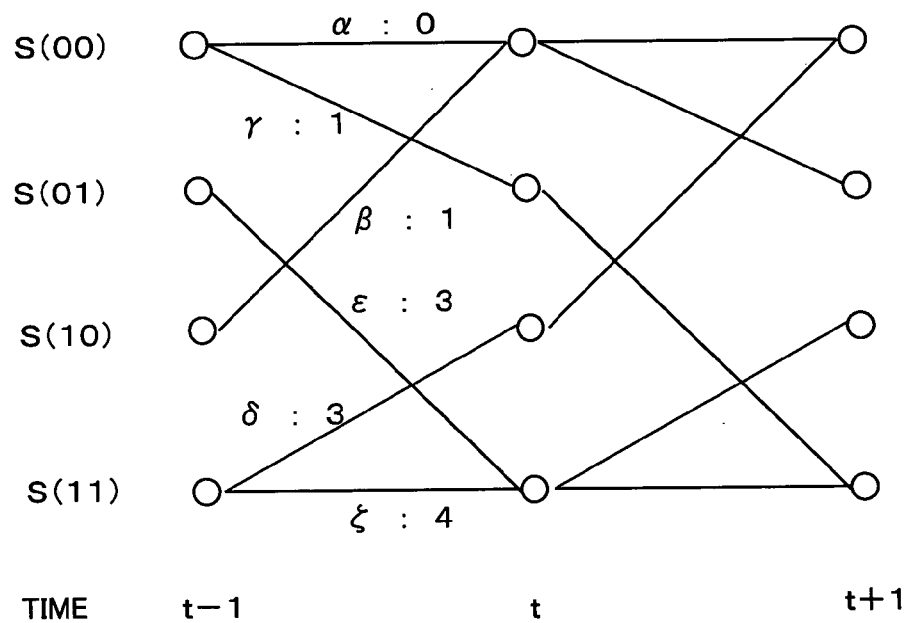
FIG. 22 is a schematic showing trellis lines of PR (1, 2, 1) properties.
Figure 23:
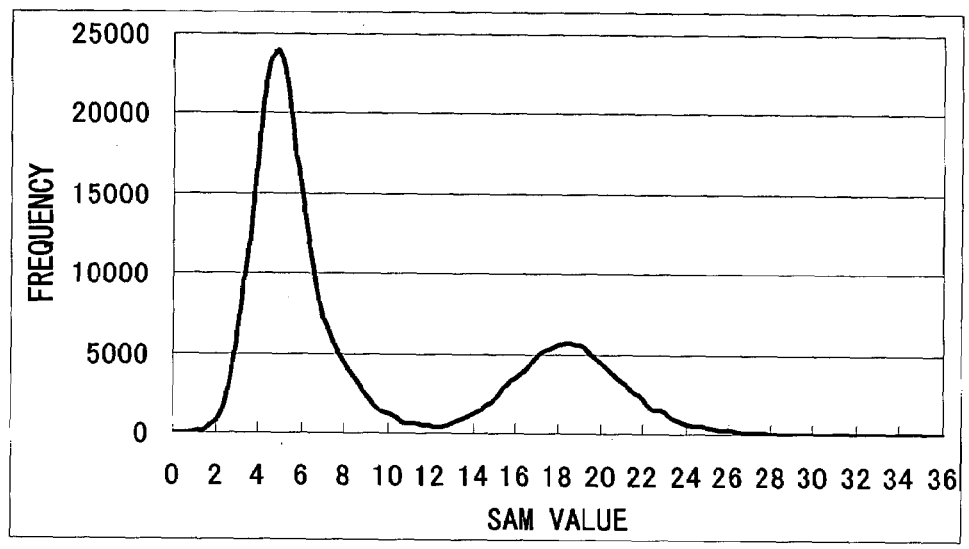
FIG. 23 is a SAM histogram calculated from an actual reproduced waveform.

For example, as shown in FIG. 20, the correct path corresponding to the pattern "0000110" is "S(000)-S(000)-S(001)-S(011)-S(110)", and the error path is "S(000)-S(001)-S(011)-S(111)-S(110)". Ideal waveform values of the correct path are −a−b+c, −b+c, c, and −a+b+c in order, and ideal waveform values of the error path are −b+c, c, b+c, and b+c in order. Thus, as in the foregoing calculation, it is possible to perform the calculation as follows on the basis of the corresponding digital reproduced signal patterns x(0), x(1), x(2), x(3).

$$SAM = [\{x(0)+b-c\}^2 + \{x(1)-c\}^2 + \{x(2)-b-c\}^2 + \{x(3)-b-c\}^2] - [\{x(0)+a+b-c\}^2 + \{x(1)+b-c\}^2 + \{x(2)-c\}^2 + \{x(3)+a-b-c\}^2]$$
$$= -2\{ax(0)+bx(1)+bx(2)+ax(3)\} - 2a^2 + 4c(a+b)$$
(29)

That is, four amplifiers 152 . . . are required in the arithmetic circuit 113, and the calculation results in p(0)=p(3)=−2a, p(1)=p(2)=−2b, q=−2a²+4c(a+b). Further, it is possible to perform the same calculation as to other patterns.

After all, in the case where the impulse response of the isolated mark that is assumed in PRML is (a, b, b, a) and the center value of the ideal waveform is c, p(0)=p(3), p(1)=p(2) in any pattern, and (When the specific pattern is "0000110" or "0110000")

$p(0)=p(3)=-2a, p(1)=p(2)=-2b, q=-2a^2+4c(a+b)$ (When the specific pattern is "0000111" or "0110001" or "1000110" "1110000")

$p(0)=p(3)=-2a, p(1)=p(2)=-2b, q=4c(a+b)$ (When the specific pattern is "0001110" or "0111000")

$p(0)=p(3)=2a, p(1)=p(2)=2b, q=2a^2-4c(a+b)$ (When the specific pattern is "0001111" or "0111001" or "1001110" or "1111000")

$p(0)=p(3)=2a, p(1)=p(2)=2b, q=-4c(a+b)$ (When the specific pattern is "1000111" or "1110001")

$p(0)=p(3)=-2a, p(1)=p(2)=-2b, q=2a^2+4c(a+b)$ (When the specific pattern is "1001111" or "1111001")

$p(0)=p(3)=2a, p(1)=p(2)=2b, q=-2a^2-4c(a+b)$ (30)

Thus, in the arithmetic circuit 133, the gains p(0), p(1), p(2), p(3) of the four amplifiers 152 and the value q of the register 153 are determined as expressed in the foregoing equation (30).

As described above, according to the signal quality evaluation section 110, it is possible to calculate SAM by computing the digital signal that has been input, so that it is possible to realize the highly accurate signal quality evaluation on the basis of SAM by means of an extremely simple system instead of a Viterbi decoding circuit. Therefore, even in a case of designing a system such as the optical disc reproducing device 101 by using an existing signal processing LSI whose PRML function has been black-boxed, it is not necessary to additionally provide a Viterbi decoding circuit for evaluation.

Note that although the standard deviation is used as a method for evaluating the SAM histogram in the evaluation circuit 114, it is obvious that the evaluation method is not limited to this since a main object of the present invention is to calculate, in a simple manner, SAM concerning the reproduced signal of a pattern whose SAM ideal value is minimum. For example, an arrangement made so that the quality of the reproduced signal is determined on the basis of the frequency of appearance of SAM which is not more than a predetermined threshold value.

Further, the signal quality evaluation section 110 is arranged so that: the evaluation of the error rate is assumed, and SAM is calculated only for such a pattern that SAM is highly likely to be less than 0 (i.e., a bit error is highly likely to occur) and the SAM ideal value is minimum. However, it is also possible to calculate SAM having other ideal values depending on usage. In this case, a pattern which results in the ideal values is checked so as to derive values that should be determined as the gains (p) of the amplifiers 152 . . . and the value q of the register 153 in the arithmetic circuit 113 by performing the same procedure as described above.

Further, the signal quality evaluation section 110 is arranged so that: specific patterns are detected from a bit pattern reproduced by the bits decoding circuit 111. However, supposing that a test track which records a known reference bit pattern is provided in the optical disc D, it is also possible to make such an arrangement that: memory means which stores a reference bit pattern is provided instead of the bits decoding circuit 111. In this case, the specific patterns detector circuit 112 refers not to the output of the bits decoding circuit 111 but to the memory means which stores the reference bit pattern, so as to detect the specific pattern.

Further, in the present embodiment, for simplicity in description, the arrangement is described as follows: the envelope of the analog reproduced waveform is adjusted so as to range from 0 to 4 (amplitude ±2, central level 2) on the assumption that PR (1, 2, 1) properties are 0, 1, 2, 3, 4 as the ideal waveform levels. However, actually, it is often that: an ideal waveform level of the digital reproduced signal is determined on the basis of a range of a numerical value output by the A/D converter 103 so as to determine the amplitude and the central level of the analog reproduced waveform accordingly. In a case of an A/D converter of 8 bits for example, its output value ranges from 0 to 255, so that the center of the ideal waveform is set to 120 and the amplitude of the ideal waveform is set to ±100 with some margins up and down. Of course, the arithmetic circuit 113 can set the gain p and the value q of the amplifier 152 in accordance with the ideal waveform levels.

Note that the present invention is not limited to the present embodiment, and the present embodiment may be varied in many ways within the scope of the claims. For example, the present embodiment may be arranged as follows.

The signal processing device of the present invention may include: computing means for multiplying a plurality of input digital signals by coefficients and adding thus multiplied value to a constant value; and evaluation means for evaluating quality of the digital signals.

Further, the signal processing device may be arranged so that the computing means calculates p(0)x(0)+p(1)x(1)+ . . . +p(n−1)x(n−1)+q by multiplying successive n-number digital signals x(0), x(1), . . . , x(n−1) by coefficients p(0), p(1), . . . , p(n−1), and by adding thus multiplied value to the constant value q.

Further, the signal processing device may include: decoding means for calculating a decoded bit pattern by decoding the digital signal; and patterns detection means for detecting one of specific patterns in the decoded bit pattern, wherein the computing means determines coefficients and a constant value on the basis of the detected one of the specific patterns detected by the patterns detection means.

Further, the signal processing device may be arranged so that: the digital signal is a reproduced signal of a known reference bit pattern, and the signal processing device includes: memory means for storing the reference bit pattern; and patterns detection means for detecting one of specific patterns in the reference bit pattern, wherein the computing means determines coefficients and a constant value on the basis of the detected one of the specific patterns detected by the pattern detection means.

Further, the signal processing device may be arranged so that: the evaluation means is n=2, p(0)=p(1) when impulse response of an isolated mark is (a, a) and a center of an ideal waveform is c, and the computing means is set so that: $p(0)=-2a$, $q=-2a^2+4ac$ when the specific pattern detected by the patterns detection means is "000", and $p(0)=-2a$, $q=4ac$ when the specific pattern is "001" or "100", $p(0)=2a$, $q=2a^2-4ac$ when the specific pattern is "010", and $p(0)=2a$, $q=-4ac$ when the specific pattern is "011" or "110", and $p(0)=-2a$, $q=2a^2+4ac$ when the specific pattern is "101", and $p(0)=2a$, $q=-2a^2-4ac$ when the specific pattern is "111".

Further, the signal processing device may be arranged so that: when a modulation method of an original bit pattern of the digital signal is d=1 Run Length Limited Coding and the impulse response of the isolated mark that is assumed by the evaluation means is (a, b, a) and the center of the ideal waveform is c, n=3, p(0)=p(2), and the computing means is set so that: $p(0)=-2a$, $p(1)=-2b$, $q=2c(2a+b)$ when the specific pattern detected by the patterns detection means is "00011" or "11000", and $p(0)=2a$, $p(1)=2b$, $q=-2c(2a+b)$ when the specific pattern is "00111" or "11100".

Further, the signal processing device may be arranged so that: when a modulation method of an original bit pattern of the digital signal is d=1 Run Length Limited Coding and the impulse response of the isolated mark that is assumed by the evaluation means is (a, b, B, a) and the center of the ideal waveform is c, n=4, p(0)=p(3), P(1)=P(2), and the computing means is set so that: $p(0)=-2a$, $p(1)=-2b$, $q=2a^2+4c(a+b)$ when the specific pattern detected by the pattern detection means is "0000110" or "0110000", and $p(0)=-2a$, $p(1)=-2b$, $q=4c(a+b)$ when the specific pattern is "0000111" or "0110001" or "1000110" or "1110000", and $p(0)=2a$, $p(1)=2b$, $q=2a^2-4c(a+b)$ when the specific pattern is "0001110" or "0111000" or "1000110", and $p(0)=2a$, $p(1)=2b$, $q=-4c(a+b)$ when the specific pattern is "0001111" or "0111001" or "1001110" or "1111000", and $p(0)=-2a$, $p(1)=-2b$, $q=2a^2+4c(a+b)$ when the specific pattern is "1000111" or "1110001", and $p(0)=-2a$, $p(1)=2b$, $q=-2a^2-4c(a+b)$ when the specific pattern is "1001111" or "1111001".

The signal processing method of the present invention may be a method for evaluating quality of the digital signal according to a value computed by multiplying a plurality of input digital signals by coefficients and by adding thus multiplied value to a constant value.

Lastly, each block of the signal quality evaluation section 110 may be arranged with hardware logic, or may be realized with software by using a CPU as follows.

That is, the signal quality evaluation section 110 (or the optical disc reproducing device 101) includes: a CPU (central processing unit) for carrying out commands of a signal quality evaluation program which realizes functions of the signal quality evaluation section 110; a ROM (read only memory) storing the program; a RAM (random access memory) for developing the program; and a memory device (storage medium) such as a memory storing the program and various kinds of data. Further, the object of the present invention can be achieved as follows: a storage medium which stores a program code (execute form program, intermediate code program, source program) of the signal quality evaluation program which is software for realizing the aforementioned functions in a computer-readable manner is provided to the optical disc reproducing device 101, and the computer (or CPU or MPU) reads and carries out the program code stored on the storage medium, thereby achieving the foregoing object. In this case, the program code read off from the storage medium realizes the aforementioned functions, and the storage medium storing the program code constitutes the present invention.

In this manner, "means" is not necessarily physical means, but functions of the respective means are realized by software in this specification. Further, a function of single means may be realized by two or more physical means, or functions of two or more means may be realized by single physical means.

As described above, the signal quality evaluation method of the present invention whereby evaluating quality of a Viterbi-decodable digital signal includes the steps of: detecting one of specific patterns in a bit pattern corresponding to the digital signal; and when one of the specific patterns is detected in the foregoing step, computing a path metric difference between a correct path dictated by the detected one of the specific patterns and an error path which fails to survive the correct path in Viterbi decoding, according to the digital signal, using equations each predetermined for a different one of the specific pattern.

Further, the signal quality evaluation device of the present invention whereby evaluating quality of a Viterbi-decodable digital signal and includes: specific patterns detection means for detecting one of specific patterns in a bit pattern corresponding to the digital signal; and computing means for, when the specific patterns detection means detects one of the specific patterns, computing a path metric difference between a correct path dictated by the detected one of the specific patterns and an error path which fails to survive the correct path in Viterbi decoding, according to the digital signal, using equations each predetermined for a different one of the specific patterns.

According to the foregoing arrangement, it is possible to compute the path metric difference between the correct path and the error path that are dictated by the specific patterns when one of the specific pattern is detected to the digital signal. Here, as the equations given to the path metric difference, at least an equation corresponding to a specific pattern is determined. Further, the path metric difference can be computed by multiplying a plurality of digital signals corresponding to the digital signal pattern by coefficients, and by adding thus multiplied value to a constant value for example.

Thus, the path metric difference (SAM) between the correct path and the error path in Viterbi decoding can be calculated by computation based on the input digital signal, so that it is possible to make a simple arrangement. Further, it is not necessary to use a Viterbi decoder upon computing the path metric difference. Therefore, it is possible to evaluate the quality of a digital signal that has not been subjected to the signal process for Viterbi-decoding, according to the path metric difference.

Thus, it is possible to evaluate the quality of the digital signal according to the path metric difference with high accuracy without using a complicate Viterbi decoding circuit. Therefore, even in the case of designing a system such as an optical disc reproducing device by using an existing signal processing LSI whose PRML function has been black-boxed, it is not necessary to additionally provide a Viterbi decoding circuit for evaluating the digital reproduced signal.

Note that the bit pattern corresponding to the digital signal may be generated from a target digital signal, or may be additionally obtained from a memory and the like in a case where the bit pattern is known like a test track of an optical disc.

Further, the signal quality evaluation device of the present invention includes evaluation means for evaluating quality of the digital signal according to a result of computation by the computing means.

According to the foregoing arrangement, it is possible to evaluate the quality of the digital signal by further using the computation result (path metric difference) given by the computing means. Note that a specific evaluation process can be arbitrarily selected. For example, a standard deviation may be calculated, or frequency of appearance not more than a predetermined threshold value may be calculated.

Further, the signal quality evaluation device of the present invention includes bit pattern generating means for comparing the digital signal with a threshold value for binarization of the digital signal, so as to generate the bit pattern.

According to the foregoing arrangement, the bit pattern generating means to evaluate the signal quality can be realized by a binary detector circuit, i.e., an arrangement extremely simpler than that of the Viterbi decoder.

Further, in the signal quality evaluation device of the present invention, the specific pattern indicates a minimum number of state transitions occurring before the error path merges with the correct path.

Figure 24:
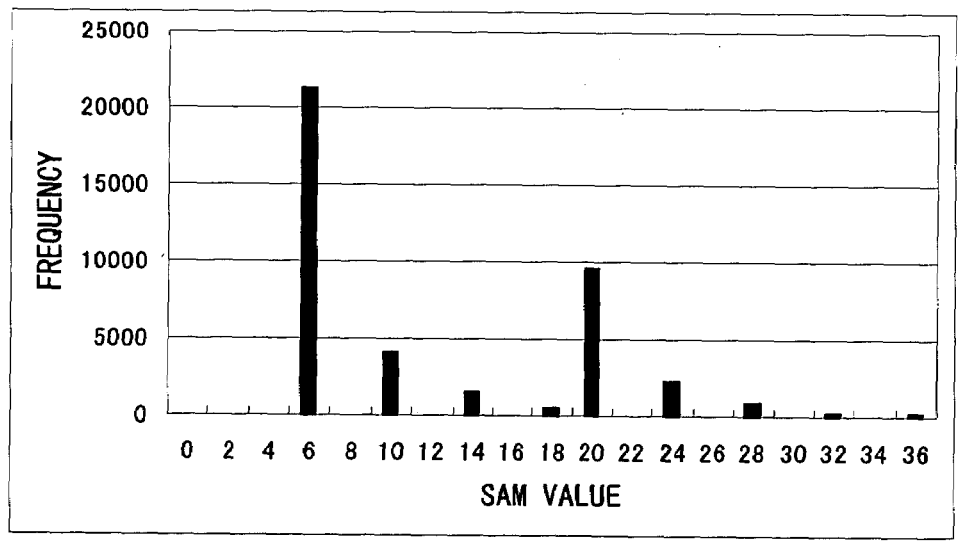
FIG. 24 is a SAM histogram calculated from an ideal waveform.

As described above, in Viterbi decoding, it is general that: as a less number of state transitions occur before the error path merges with the correct path, the more likely errors occur. As shown in FIG. 24, a pattern which indicates a minimum number of state transitions has dominant influence in the histogram of the path metric difference.

Then, a pattern which indicates the minimum number of state transitions is determined as a specific pattern as arranged in the foregoing manner, so that it is possible to perform computation and evaluation of the path metric difference focusing only on a pattern which tends to cause errors. Therefore, in the case where the control is based on the evaluation result, it is possible to keep the error rate lower than the case where all the patterns are taken into consideration.

Note that a specific pattern can be arbitrarily selected depending on usage, as long as the specific pattern dictates the correct path and the error path one of which will be a survivor in Viterbi decoding. For example, a plurality of patterns may be selected from patterns with small number of state transitions. Of course, it is also possible to make selection without referring to the number of state transitions.

Further, the signal quality evaluation device of the present invention is arranged so that: the equations are predetermined in accordance with partial response properties of the Viterbi decoding and switchable in accordance with the detected specific pattern.

According to the foregoing arrangement, the equation indicating the path metric difference can be determined for each pattern in accordance with the partial response properties of Viterbi decoding. Therefore, if the equations of a plurality of specific patterns are predetermined and are switchable in accordance with each specific pattern as described above, it is possible to perform computation and evaluation of the path metric differences concerning the plurality of specific patterns at the same time.

Further, the reproducing device of the present invention includes: the aforementioned signal quality evaluation device; Viterbi decoding means for Viterbi decoding a digital signal; and control means for controlling the quality of the digital signal according to an output from the signal quality evaluation device.

As described above, the signal quality evaluation device can evaluate the quality of the digital signal without using the Viterbi decoding circuit. Thus, the reproducing device can control the quality of the digital signal according to the output of the evaluation result, concerning the digital signal, that has been given by the signal quality evaluation device. Specifically, if an optical disc reproducing device is used for example, it is possible to optimally control the power of a light beam emitted onto an optical disc.

Further, the signal quality evaluation program of the present invention is arranged so that the program causes a computer to function as each of the means.

According to the foregoing arrangement, each means of the signal quality evaluation device is realized by a computer, so that it is possible to realize the signal quality evaluation device. Thus, the signal quality evaluation device can evaluate the quality of the digital signal without using the Viterbi decoding circuit.

Further, the computer-readable storage medium storing the signal quality evaluation program of the present invention is a computer-readable storage medium storing the signal quality evaluation program which causes a computer to realizes each of the means so as to operate the signal quality evaluation device.

According to the foregoing arrangement, it is possible to cause a computer to realize the signal quality evaluation device by means of the signal quality evaluation program read out from the storage medium.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A waveform equalizing device for adaptively equalizing a waveform of a Viterbi-decodable input signal pattern, comprising:

equalization means for generating an equalized signal pattern through equalization of a waveform according to the input signal pattern;

path metric difference detection means for detecting a path metric difference between a correct path and an error path in Viterbi decoding based on the equalized signal pattern;

target value setting means for setting a target value for the path metric difference; and equalization adapting means for adapting the equalization according to an error of the detected path metric difference from the target value.

2. The waveform equalizing device as defined in claim 1, wherein:

the path metric difference detection means sequentially detects path metric differences between associated correct paths and error paths as the Viterbi decoding proceeds; and the equalization adapting means adapts the equalization so as to minimize a mean square of errors of the detected path metric differences.

3. The waveform equalizing device as defined in claim 1, wherein:

the equalization means sequentially associates input signals forming the input signal pattern with equalization coefficients and convolves the equalization coefficients with the input signals associated with the equalization coefficients, so as to generate the equalized signal pattern; and the equalization adapting means updates the equalization coefficients so as to minimize a square of the error which is a function of the equalization coefficients, in order to adapt the equalization.

4. The waveform equalizing device as defined in claim 3, wherein:

the equalization adapting means subtracts a gradient multiplied by a constant value from the equalization coefficients, so as to update the equalization coefficients, the gradient being a partial differentiation of the function with respect to the equalization coefficient.

5. The waveform equalizing device as defined in claim 4, wherein:

the equalization adapting means is arranged to calculate a product of the error and a sum of the input signals with predetermined weights to obtain the gradient, the input signals forming the input signal pattern giving a path corresponding to the path metric difference where the error occurs.

6. The waveform equalizing device as defined in claim 1, further comprising:

decoding means for decoding the input signal pattern to generate a decoded bit pattern; and pattern detection means for detecting, in the decoded bit pattern, one of such specific bit patterns that when an ideal waveform signal pattern for the Viterbi decoding is assumed, the path metric difference becomes equal to a pre-specified value, wherein when one of the specific patterns is detected, the equalization adapting means adapts the equalization according to an error of a path metric difference, from a target value, detected according to a signal pattern corresponding to the detected one of the specific patterns in the equalized signal pattern.

7. The waveform equalizing device as defined in claim 6, further comprising:

information data decoding means for Viterbi decoding the equalized signal pattern to generate an information data bit pattern used as information data, wherein the decoding means performs Viterbi decoding with a shorter path memory length than that in the Viterbi decoding by the information data decoding means, so as to generate the decoded bit pattern.

8. The waveform equalizing device as defined in claim 6, wherein:

the pre-specified value is a number of minimum values of the path metric difference according to the ideal waveform signal pattern.

9. The waveform equalizing device as defined in claim 6, wherein:

the target value setting means sets the target value to the pre-specified value.

10. The waveform equalizing device as defined in claim 6, wherein:

the pre-specified value is a minimum value of the path metric difference according to the ideal waveform signal pattern.

11. The waveform equalizing device as defined in claim 1, further comprising:

memory means for storing a predetermined reference bit pattern and for, when the memory means receives as the input signal pattern a reference signal pattern which, when decoded, should provide the reference bit pattern, outputting the reference bit pattern in synchronism with the received reference signal pattern; and pattern detection means for detecting, in the reference bit pattern fed from the memory means, one of such specific bit patterns that when an ideal waveform signal pattern for the Viterbi decoding is assumed, the path metric difference becomes equal to a pre-specified value, wherein when one of the specific patterns is detected, the equalization adapting means adapts the equalization according to an error of a path metric difference, from a target value, detected according to a signal pattern corresponding to the detected one of the specific patterns in the reference signal pattern.

12. The waveform equalizing device as defined in claim 1, further comprising:

decoding means for decoding the input signal pattern to generate a decoded bit pattern, wherein when the decoding means generates the decoded bit pattern corresponding to the correct path surviving in the Viterbi decoding, the target value setting means sets the target value for the path metric difference detected according to the signal pattern corresponding to the decoded pattern in the equalized signal pattern, to the path metric difference according to the ideal waveform signal pattern in a case when an ideal waveform signal pattern for the Viterbi decoding corresponding to the decoded pattern is assumed.

13. The waveform equalizing device as defined in claim 1, further comprising:

memory means for storing a predetermined reference bit pattern and for, when the memory means receives as the input signal pattern a reference signal pattern which, when decoded, should provide the reference bit pattern, outputting the reference bit pattern in synchronism with the received reference signal pattern, wherein when the memory means outputs the reference bit pattern, the target value setting means sets the target value for the path metric difference detected according to the signal pattern which, when decoded, should provide the reference bit pattern in the equalized signal pattern, to the path metric difference according to the ideal waveform signal pattern in a case when an ideal waveform signal pattern for the Viterbi decoding corresponding to the decoded pattern is assumed.

14. An information reproducing device, comprising:
the waveform equalizing device as defined in claim 1; and
reproduction means for reproducing the input signal pattern from an information storage medium.

15. A communications device, comprising:
the waveform equalizing device as defined in claim 1; and
receiving means for receiving the input signal pattern transmitted over a communication path.

16. A waveform equalizing device for adaptively equalizing a waveform of a Viterbi-decodable input signal pattern, comprising:
an FIR filter for generating an equalized signal pattern through equalization of a waveform according to the input signal pattern;
a Viterbi decoding circuit for detecting a path metric difference between a correct path and an error path in Viterbi decoding based on the equalized signal pattern;
a target value register for setting a target value for the path metric difference; and
a tap coefficients update circuit for adapting the equalization according to an error of the detected path metric difference from the target value.

17. The waveform equalizing device as defined in claim 16, wherein:
the Viterbi decoding circuit decodes the input signal pattern to generate a decoded bit pattern;
the waveform equalizing device further comprises a specific pattern detector circuit for detecting, in the decoded bit pattern, one of such specific bit patterns that when an ideal waveform signal pattern for the Viterbi decoding is assumed, the path metric difference becomes equal to a pre-specified value; and
when one of the specific patterns is detected, the tap coefficients update circuit adapts the equalization according to an error of a path metric difference, from a target value, detected according to a signal pattern corresponding to the detected one of the specific patterns in the equalized signal pattern.

18. The waveform equalizing device as defined in claim 17, wherein:
the Viterbi decoding circuit Viterbi decodes the equalized signal pattern to generate an information data bit pattern used as information data and performs Viterbi decoding with a shorter path memory length than a path memory length with which the information data bit pattern is generated, so as to generate the decoded bit pattern.

19. The waveform equalizing device as defined in claim 16, further comprising:
a reference bit pattern memory for storing a predetermined reference bit pattern and for, when the reference bit pattern memory receives as the input signal pattern a reference signal pattern which, when decoded, should provide the reference bit pattern, outputting the reference bit pattern in synchronism with the received reference signal pattern; and
a specific patterns detector circuit for detecting, in the reference bit pattern fed from the reference bit pattern memory, one of such specific bit patterns that when an ideal waveform signal pattern for the Viterbi decoding is assumed, the path metric difference becomes equal to a pre-specified value,
wherein
when one of the specific patterns is detected, the tap coefficients update circuit adapts the equalization according to an error of a path metric difference, from a target value, detected according to a signal pattern corresponding to the detected one of the specific patterns in the reference signal pattern.

20. The waveform equalizing device as defined in claim 16, wherein:
the Viterbi decoding circuit decodes the input signal pattern to generate a decoded bit pattern;
wherein
when the Viterbi decoding circuit generates the decoded bit pattern corresponding to the correct path surviving in the Viterbi decoding, the target value register sets the target value for the path metric difference detected according to the signal pattern corresponding to the decoded pattern in the equalized signal pattern, to the path metric difference according to the ideal waveform signal pattern in a case when an ideal waveform signal pattern for the Viterbi decoding corresponding to the decoded pattern is assumed.

21. The waveform equalizing device as defined in claim 16, further comprising:
a reference bit pattern memory for storing a predetermined reference bit pattern and for, when the reference bit pattern memory receives as the input signal pattern a reference signal pattern which, when decoded, should provide the reference bit pattern, outputting the reference bit pattern in synchronism with the received reference signal pattern,
wherein
when the reference bit pattern memory outputs the reference bit pattern, the target value register sets the target value for the path metric difference detected according to the signal pattern which, when decoded, should provide the reference bit pattern in the equalized signal pattern, to the path metric difference according to the ideal waveform signal pattern in a case when an ideal waveform signal pattern for the Viterbi decoding corresponding to the decoded pattern is assumed.

22. An information reproducing device, comprising:
the waveform equalizing device as defined in claim 16; and
an optical pickup for reproducing the input signal pattern from an information storage medium.

23. A communications device, comprising:
the waveform equalizing device as defined in claim 16; and
receiver for receiving the input signal pattern transmitted over a communication path.

24. A waveform equalization method of adaptively equalizing a waveform of a Viterbi-decodable input signal pattern, comprising the steps of:
(a) generating an equalized signal pattern through equalization of a waveform according to the input signal pattern;
(b) detecting a path metric difference between a correct path and an error path in Viterbi decoding based on the equalized signal pattern; and
(c) adapting the equalization according to an error of the detected path metric difference from a target value for the path metric difference.

25. The waveform equalization method as defined in claim 24, wherein:
  step (b) is recursively carried out so as to sequentially detect path metric differences between associated correct paths and error paths as the Viterbi decoding proceeds; and
  step (c) adapts the equalization so as to minimize a mean square of errors of the detected path metric differences.

26. The waveform equalization method as defined in claim 24, wherein:
  step (a) sequentially associates input signals forming the input signal pattern with equalization coefficients and convolves the equalization coefficients with the input signals associated with the equalization coefficients, so as to generate the equalized signal pattern; and
  step (c) updates the equalization coefficients so as to minimize a square of the error which is a function of the equalization coefficients, in order to adapt the equalization.

27. A signal quality evaluation device for evaluating quality of a Viterbi-decodable digital signal, comprising:
  specific patterns detection means for detecting one of specific patterns in a bit pattern corresponding to the digital signal; and
  computing means for, when the specific patterns detection means detects one of the specific patterns, computing a path metric difference between a correct path dictated by the detected one of the specific patterns and an error path which fails to survive the correct path in Viterbi decoding, according to the digital signal, using equations each predetermined for a different one of the specific patterns.

28. The signal quality evaluation device as defined in claim 27, further comprising:
  evaluation means for evaluating the quality according to a result of computation by the computing means.

29. The signal quality evaluation device as defined in claim 27, further comprising:
  bit pattern generating means for comparing the digital signal with a threshold value for binarization of the digital signal, so as to generate the bit pattern.

30. The signal quality evaluation device as defined in claim 27, wherein:
  the detected specific pattern indicates a minimum number of state transitions occurring before the error path merges with the correct path.

31. The signal quality evaluation device as defined in claim 27, wherein:
  the equations are predetermined in accordance with partial response properties of the Viterbi decoding and switchable in accordance with the detected specific pattern.

32. A reproducing device, comprising:
  the signal quality evaluation device as defined in claim 27;
  Viterbi decoding means for Viterbi decoding a digital signal; and
  control means for controlling the quality of the digital signal according to an output from the signal quality evaluation device.

33. A signal quality evaluation device for evaluating quality of a Viterbi-decodable digital signal, comprising:
  a specific patterns detector circuit for detecting one of specific patterns in a bit pattern corresponding to the digital signal; and
  a computing circuit for, when the specific patterns detector circuit detects one of the specific patterns, computing a path metric difference between a correct path dictated by the detected one of the specific patterns and an error path which fails to survive the correct path in Viterbi decoding, according to the digital signal, using equations each predetermined for a different one of the specific patterns.

34. The signal quality evaluation device as defined in claim 33, further comprising:
  an evaluation circuit for evaluating the quality according to a result of computation by the computing circuit.

35. The signal quality evaluation device as defined in claim 33, further comprising:
  a bits decoding circuit for comparing the digital signal with a threshold value for binarization of the digital signal, so as to generate the bit pattern.

36. A signal quality evaluation method of evaluating quality of a Viterbi-decodable digital signal, comprising the steps of:
  (a) detecting one of specific patterns in a bit pattern corresponding to the digital signal; and
  (b) when step (a) detects one of the specific patterns, computing a path metric difference between a correct path dictated by the detected one of the specific patterns and an error path which fails to survive the correct path in Viterbi decoding, according to the digital signal, using equations each predetermined for a different one of the specific patterns.

37. A waveform equalization program in combination with a computer of a waveform equalizing device, said program for controlling of the waveform equalizing device and including, code segments to:
  generate an equalized signal pattern through equalization of a waveform according to the input signal pattern;
  detect a path metric difference between a correct path and an error path in Viterbi decoding based on the equalized signal pattern;
  set a target value for the path metric difference; and
  adapt the equalization according to an error of the detected path metric difference from the target value.

38. A computer-readable storage medium on which is stored a waveform equalization program, said program including code segments to:
  generate an equalized signal pattern through equalization of a waveform according to the input signal pattern;
  detect a path metric difference between a correct path and an error path in Viterbi decoding based on the equalized signal pattern;
  set a target value for the path metric difference; and
  adapt the equalization according to an error of the detected path metric difference from the target value.

39. A signal quality evaluation program in combination with a computer of a signal quality evaluation device, said program for controlling operation of said signal quality evaluation device and including code segments to:
  detect one of specific patterns in a bit pattern corresponding to the digital signal; and
  when the specific patterns detection means detects one of the specific patterns, compute a path metric difference between a correct path dictated by the detected one of the specific patterns and an error path which fails to survive the correct path in Viterbi decoding, according to the digital signal, using equations each predetermined for a different one of the specific patterns.

40. A computer-readable storage medium on which is stored a signal quality evaluation program, said program including segments to:

detect one of specific patterns in a bit pattern corresponding to the digital signal; and when the specific patterns detection means detects one of the specific patterns, compute a path metric difference between a correct path dictated by the detected one of the specific patterns and an error path which fails to survive the correct path in Viterbi decoding, according to the digital signal, using equations each predetermined for a different one of the specific patterns.

* * * * *